United States Patent
Tsuchiya

(10) Patent No.: US 12,165,419 B2
(45) Date of Patent: Dec. 10, 2024

(54) MOVABLE APPARATUS, CONTROL METHOD FOR MOVABLE APPARATUS, AND STORAGE MEDIUM

(71) Applicant: CANON KABUSHIKI KAISHA, Tokyo (JP)

(72) Inventor: Tomoaki Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/317,947

(22) Filed: May 16, 2023

(65) Prior Publication Data
US 2023/0394845 A1    Dec. 7, 2023

(30) Foreign Application Priority Data

Jun. 3, 2022 (JP) .................. 2022-091097

(51) Int. Cl.
*G06V 20/58* (2022.01)
*B60W 50/14* (2020.01)
*G06F 3/14* (2006.01)
*G06T 3/40* (2006.01)
*G06T 5/80* (2024.01)

(52) U.S. Cl.
CPC ............. *G06V 20/58* (2022.01); *B60W 50/14* (2013.01); *G06F 3/14* (2013.01); *G06T 3/40* (2013.01); *G06T 5/80* (2024.01)

(58) Field of Classification Search
CPC ...................................................... G06V 20/58
See application file for complete search history.

(56) References Cited

U.S. PATENT DOCUMENTS

2018/0043829 A1*  2/2018  Cordell ................. G01S 19/485
2021/0392297 A1*  12/2021  Liu ........................... B60R 1/08

FOREIGN PATENT DOCUMENTS

| EP | 4155129 A1 | 3/2023 |
|----|------------|--------|
| EP | 4155817 A1 | 3/2023 |
| EP | 4156125 A1 | 3/2023 |
| EP | 4156127 A1 | 3/2023 |
| JP | H09-1097 A | 1/1997 |
| JP | 2004-345554 A | 12/2004 |
| JP | 2010-95202 A | 4/2010 |

OTHER PUBLICATIONS

Extended European Search Report issued in corresponding EP Patent Application No. 23174483.0, dated Oct. 25, 2023.

* cited by examiner

Primary Examiner — Daniel T Tekle
(74) Attorney, Agent, or Firm — Carter, DeLuca & Farrell LLP

(57) ABSTRACT

A movable apparatus includes a camera unit including an optical system for forming an optical image with a high-resolution area and a low-resolution area on a light reception surface of an imaging unit, the camera unit being installed on the lateral side of the movable apparatus, and A $\tan(h1/(d1+x1))-\theta v/2 < \phi v < A\tan(h1/(d2+x1))+\theta v/2$, for example, is satisfied when a vertical angle of view of the high-resolution area is $\theta v$, a vertical direction angle of an optical axis of the optical system is $\phi v$, an offset between a viewpoint position of a driver in a long axis direction of the movable apparatus and the camera unit is $x1$, an offset in a height direction of the camera unit from the ground is $h1$, distances from the viewpoint position of the driver in a long axis direction are $d1$ and $d2$.

24 Claims, 10 Drawing Sheets

MOVABLE APPARATUS, CONTROL METHOD FOR MOVABLE APPARATUS, AND STORAGE MEDIUM

BACKGROUND OF THE INVENTION

Field of the Invention

The present invention relates to a movable apparatus, a control method for a movable apparatus, a storage medium, and the like.

Description of the Related Art

In recent years, there has been a demand to replace a rearview mirror (a rear view mirror) mounted in a vehicle with an electronic rearview mirror. For example, Japanese Patent Laid-Open No. 2010-95202 discloses an electronic rearview mirror system including an imaging unit with a rearward side outside a vehicle as a rearward imaging range and a display unit inside the vehicle and allowing a driver to confirm a situation on the rearward side outside the vehicle by displaying an image captured by the imaging unit on the display in the vehicle.

Further, Japanese Patent Laid-Open No. 2004-345554 discloses a rearward side confirmation system for allowing a driver to confirm a blind spot behind a vehicle, for example, at the time of rearward movement by installing a camera to image a rearward side of vehicle and displaying a captured image inside a vehicle cabin.

A camera serving as an imaging unit that captures an image for the electronic rearview mirror described above is required to have a high resolution so that the driver can more precisely confirm a situation of a relatively far rearward side. On the other hand, a camera for a lateral side collision detection system is required to image a wider range to confirm the safety in a wider range including a blind spot on the lateral side of the vehicle or the rearward lateral side in order to avoid collision or entanglement if the vehicle turns left.

Further, if both an electronic rearview mirror system and a lateral side collision detection system are mounted in a vehicle, individual mounting of a camera for the electronic rearview mirror system and a camera for a lateral side collision detection system complicates an in-vehicle image processing system. Such a problem also occurs, for example, in an automatic driving system that performs automated driving or the like with a plurality of cameras disposed to photograph surroundings of a vehicle.

On the other hand, it is possible to reduce the number of cameras installed in the vehicle, for example, by adopting a camera with a special ultra wide angle lens. However, if the ultra-wide-angle lens is used, there is the problem that a wide angle of view can be obtained, but an amount of distortion in a peripheral portion is large, and it is difficult to display a high-resolution and low-distortion image on an electronic side mirror or the like.

SUMMARY OF THE INVENTION

A movable apparatus of an aspect of the present invention includes a camera unit including an optical system for forming an optical image with a high-resolution area and a low-resolution area on a light reception surface of an imaging unit, the camera unit being installed on the lateral side of the movable apparatus, wherein the camera unit is installed to satisfy $$A\tan(h1/(d1+x1))-\theta v/2 < \phi v < A\tan(h1/(d2+x1))+\theta v/2 \quad \text{(Equation 2)}$$

$$\Phi h\_limit = \max(A\tan((w1-z)/(d1+x1))-\theta h/2, A\tan((w2-z)/(d2+x1))-\theta h/2) \quad \text{(Equation 3)}$$

$$\Phi h\_limit < \phi h < -A\tan(z/(d1+x1))+\theta h/2 \quad \text{(Equation 4)}$$

when a vertical angle of view of the high-resolution area is $\theta v$, a horizontal angle of view is $\theta h$, a vertical angle of an optical axis of the optical system is $\phi v$, a horizontal angle is $\phi h$, an offset between a viewpoint position of a driver in a long axis direction of the movable apparatus and the camera unit is $x1$, an offset of the camera unit from a side of the movable apparatus in a short axis direction of the movable apparatus is $z$, an offset in a height direction of the camera unit from the ground is $h1$, distances from the viewpoint position of the driver in a long axis direction are $d1$ and $d2$, and predetermined widths on the ground at the distances $d1$ and $d2$ are $w1$ and $w2$, and to satisfy if $x2 < x1$, $$A\tan(h1/(x1-x2))-\theta lv/2 < \phi v \quad \text{(Equation 18)}$$

$$A\tan((w7-z)/(x1-x2))-\theta lh/2 < \phi h < -A\tan(z/(x1-x2))+\theta lh/2 \quad \text{(Equation 19)}$$

if $x2 > x1$, $$-A\tan((h1-h2)/(x2-x1))-\theta lv/2+180° < \phi v \quad \text{(Equation 20)}$$

$$-A\tan((w7-z)/(x2-x1))-\theta lh/2+180° < \phi h \quad \text{(Equation 21 and}$$

if $x2 = x1$, $$+90° < \phi v+\theta lv/2 \quad \text{(Equation 22)}$$

$$-90° > \phi h-\theta lh/2 \quad \text{(Equation 23)}$$

$$+90° < \phi h+\theta lh/2 \quad \text{(Equation 24)}$$

when a vertical angle of view of the low-resolution area is $\theta lv$, a horizontal angle of view is $\theta lh$, a predetermined height from the ground is $h2$, a distance from the viewpoint position of the driver to a front end of the movable apparatus is $x2$, a total length of the movable apparatus is $d7$, and a predetermined width on the ground is $w7$.

Further features of the present invention will become apparent from the following description of embodiments with reference to the attached drawings.

BRIEF DESCRIPTION OF THE DRAWINGS

FIG. 5 is a diagram illustrating an example of a defined area and an installation condition of a camera unit in a medium freight vehicle or the like.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In First Embodiment, an image processing system that can optimize allocation of an angle of view while achieving both a display for a high-definition electronic rearview mirror or electronic side mirror and a display for confirmation of surroundings of a vehicle such as a wide range of rearward side with a small number of cameras will be described.

Figure 1:
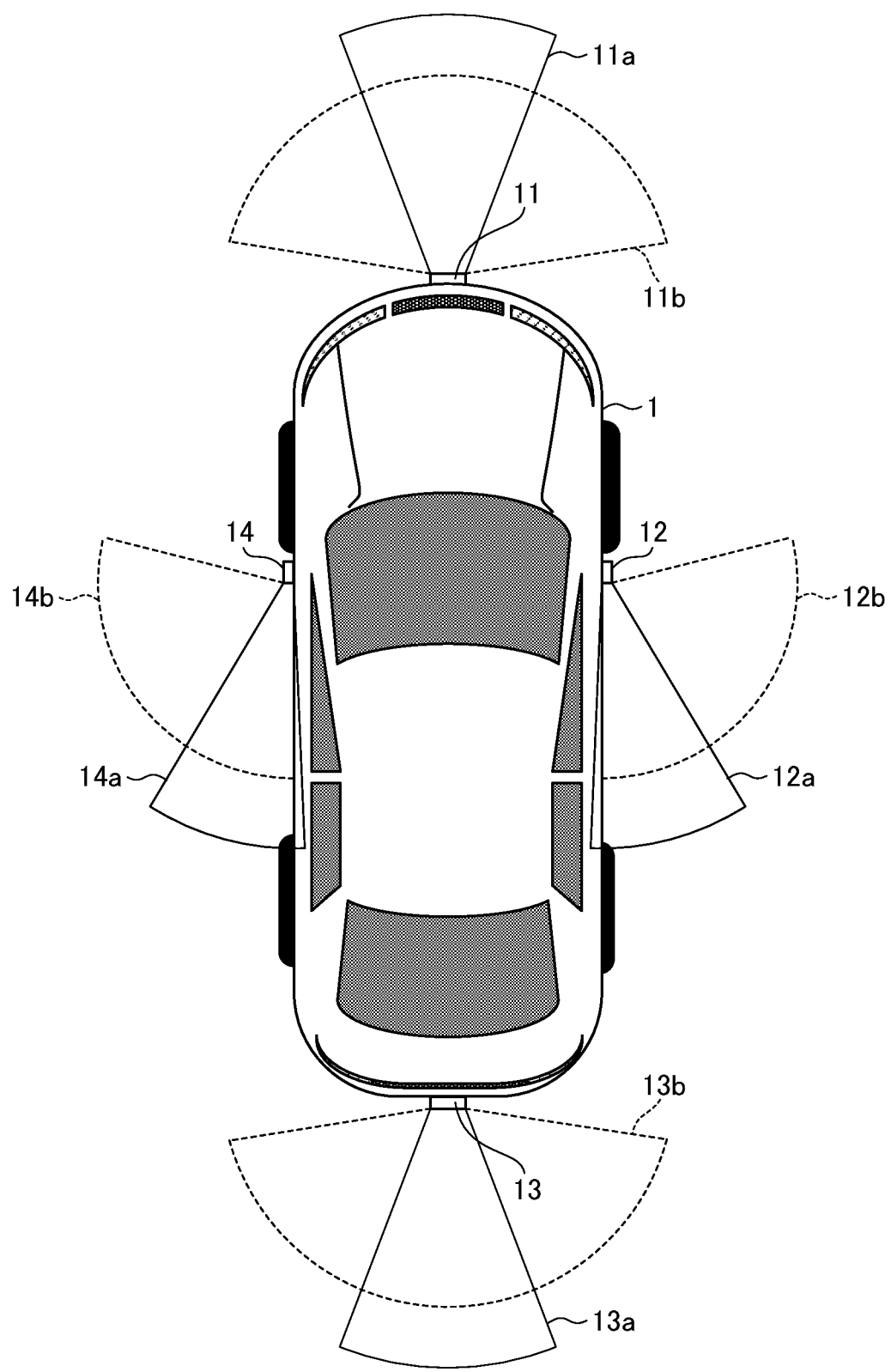
FIG. 1 is a diagram illustrating a positional relationship between a camera unit and a vehicle in First Embodiment.

FIG. 1 is a diagram illustrating a positional relationship between a camera unit of First Embodiment and a vehicle.

In First Embodiment, as illustrated in FIG. 1, camera units 11, 12, 13, and 14 are installed on the front side, right lateral side, rearward side, and left lateral side of a vehicle 1, such as a car, which is a movable apparatus. Although there are four camera units in First Embodiment, the number of camera units is not limited to four, and there need only be at least one camera unit.

The camera units 11 to 14 are installed so that frontward, right lateral, left lateral, and rearward sides of the vehicle 1 serving as a movable apparatus are imaging ranges.

In First Embodiment, the camera units 11 to 14 have substantially the same configuration, each including an image sensor that captures an optical image and an optical system that forms the optical image on a light reception surface of the image sensor.

For example, the camera units 11 and 13 are installed so that optical axes of optical systems of the camera units 11 and 13 are substantially horizontal if the vehicle 1 is in a substantially horizontal state, and the camera units 12 and 14 are installed so that optical axes of optical systems of the camera units 12 and 14 are slightly downward with respect to a horizontal direction, or directed directly downward.

Further, the optical systems of the camera units 11 to 14 used in First Embodiment are configured to be able to obtain a high-definition image at a small angle of view around the optical axis and obtain a low-resolution captured image at a large angle of view.

11*a* to 14*a* are imaging angles of view allowing a high-resolution low-distortion image to be captured, and 11*b* to 14*b* are imaging angles of view allowing a low-resolution high-distortion image to be captured. 11*b* to 14*b* include areas 11*a* to 14*a*. That is, a high-resolution captured image can be obtained at the narrow imaging angles of view 11*a* to 14*a* at centers in the large imaging angles of view 11*b* to 14*b*.

Next, the optical systems included in the camera units 11 to 14 in First Embodiment will be described using FIG. 2.

Although characteristics of the optical systems of the camera units 11 to 14 may not be the same, the optical systems of the camera units 11 to 14 are assumed to have substantially the same characteristics, and the optical system of the camera unit 11 will be described as an example in First Embodiment.

FIGS. 2A and 2B are diagrams illustrating optical characteristics of an imaging unit in First Embodiment, and FIG. 2A is a diagram illustrating an image height y at each half angle of view on the light reception surface of the image sensor, of the optical system of the camera unit 11 in First Embodiment in a contour line form.

FIG. 2B is a diagram illustrating a projection characteristic representing a relationship between the image height y and a half angle of view θ of the optical system of the camera unit 11 in First Embodiment. In FIG. 2B, the half angle of view (an angle formed by the optical axis and an incident light beam) θ is a horizontal axis, and an image formation height (image height) y on a sensor surface (image surface) of the camera unit 11 is a vertical axis.

The optical system of the camera unit 11 in First Embodiment is configured so that a projection characteristic y(θ) is different between an area smaller than a predetermined half angle of view θa and an area equal to or greater than the half angle of view θa, as illustrated in FIG. 2B. Therefore, when an amount of increase in the image height y with respect to the half angle of view θ per unit is referred to as resolution, the resolution differs depending on the area.

It can be said that this local resolution is represented by a differential value dy(θ)/dθ of the projection characteristic y(θ) at the half angle of view θ. That is, it can be said that the resolution increases if a slope of the projection characteristic y(θ) in FIG. 2B is larger. Further, it can be said that the resolution is higher as an interval between the image heights y at the respective half angles of view in the contour line form in FIG. 2A increases.

In First Embodiment, an area near a center (central portion) formed on the sensor surface when the half angle of view θ is smaller than the predetermined half angle of view θa is referred to as a high-resolution area 10*a*, and an area near an outer side (a peripheral portion) in which the half angle of view θ is equal to or larger than the predetermined half angle of view θa is referred to as a low-resolution area 10*b*. The high-resolution area 10*a* corresponds to the imaging angle of view 11*a*, and an angle of view including the high-resolution area 10*a* and the low-resolution area 10*b* corresponds to the imaging angle of view 11*b*.

In First Embodiment, a circle on a boundary between the high-resolution area 10*a* and the low-resolution area 10*b* is called a resolution boundary, and a boundary image on a display screen corresponding to the resolution boundary is called a display resolution boundary or simply a boundary image.

The boundary image (the display resolution boundary) displayed on the display screen may not be circular. For convenience, the boundary image may be displayed in a rectangular shape or the like. Further, the boundary between the high-resolution area 10*a* and the low-resolution area 10*b* may not be a circular shape, but may be an elliptical shape or a distorted shape.

Further, a centroid of a boundary 93 (the high-resolution area 10*a*) may not match a position at which the optical axis of the optical system intersects the light reception surface. However, in First Embodiment, since the centroid of the boundary 93 (the high-resolution area 10*a*) substantially matches the position at which the optical axis of the optical system intersects the light reception surface, it is easy to design the optical system and it is possible to obtain stable optical characteristics and suppress a load of distortion correction.

In First Embodiment, the high-resolution area 10a is a low-distortion area with relatively small distortion, and the low-resolution area 10b is a high-distortion area with a relatively great distortion. Therefore, in First Embodiment, the high-resolution area and the low-resolution area correspond to the low-distortion area and the high-distortion area, respectively, and the high-resolution area and the low-resolution area are sometimes referred to as the low-distortion area and the high-distortion area, respectively.

The optical system included in the camera unit 11 in First Embodiment is configured so that the projection characteristic y(θ) is greater than f×θ in the high-resolution area (low-distortion area) 10a (f is a focal length of the optical system included in the camera unit 11). Further, the projection characteristic y(θ) in the high-resolution area (low-distortion area) is set to be different from the projection characteristic in the low-resolution area (high-distortion area).

Further, when θ max is a maximum half angle of view of the optical system included in the camera unit 11, a ratio θa/θ max between θa and θ max is preferably equal to or greater than a predetermined lower limit value and, for example, the predetermined lower limit value is preferably 0.15 to 0.16.

Further, the ratio θa/θ max of θa to θ max is preferably equal to or smaller than a predetermined upper limit value and, for example, preferably 0.25 to 0.35. For example, if θ max is 90°, the predetermined lower limit value is 0.15 and the predetermined upper limit value is 0.35, and θa is preferably determined within the range of 13.5 to 31.5°.

Further, the optical system of the camera unit 11 is configured such that the projection characteristic y(θ) also satisfies Equation 1 below.

$$1 < f \times \sin(\theta\ max)/y(\theta\ max) \leq 1.9 \quad \text{(Equation 1)}$$

f is the focal length of the optical system included in the camera unit 11, as described above. It is possible to increase a center resolution as compared with an orthographic projection type (that is, if y=f×sin θ) of fisheye lens having the same maximum image formation height by setting the lower limit value to 1.

Further, it is possible to maintain good optical performance while obtaining an angle of view equivalent to that of a fisheye lens by setting the upper limit value to 1.9. The upper limit value may be determined in consideration of resolution balance between the high-resolution area and the low-resolution area, and is preferably set in a range of 1.9 to 1.4.

When the optical system is configured as described above, high resolution can be obtained in the high-resolution area 10a, while in the low-resolution area 10b, the amount of increase in the image height y with respect to the half angle of view θ per unit is reduced, making it possible to image a wider angle of view. Therefore, it is possible to obtain a high resolution in the high-resolution area 10a while setting a wide angle of view equivalent to that of a fish-eye lens as the imaging range.

Further, in First Embodiment, since the high-resolution area (low-distortion area) has a characteristic close to a central projection scheme (y=f×tan θ) that is a projection characteristic of an optical system for normal imaging or an equidistant projection scheme (y=f×θ), optical distortion is small and precise display is possible. Therefore, it is possible to obtain a natural perspective at the time of visually observing nearby vehicles or the like, and to obtain good visibility by suppressing deterioration of image quality.

Figure 2:
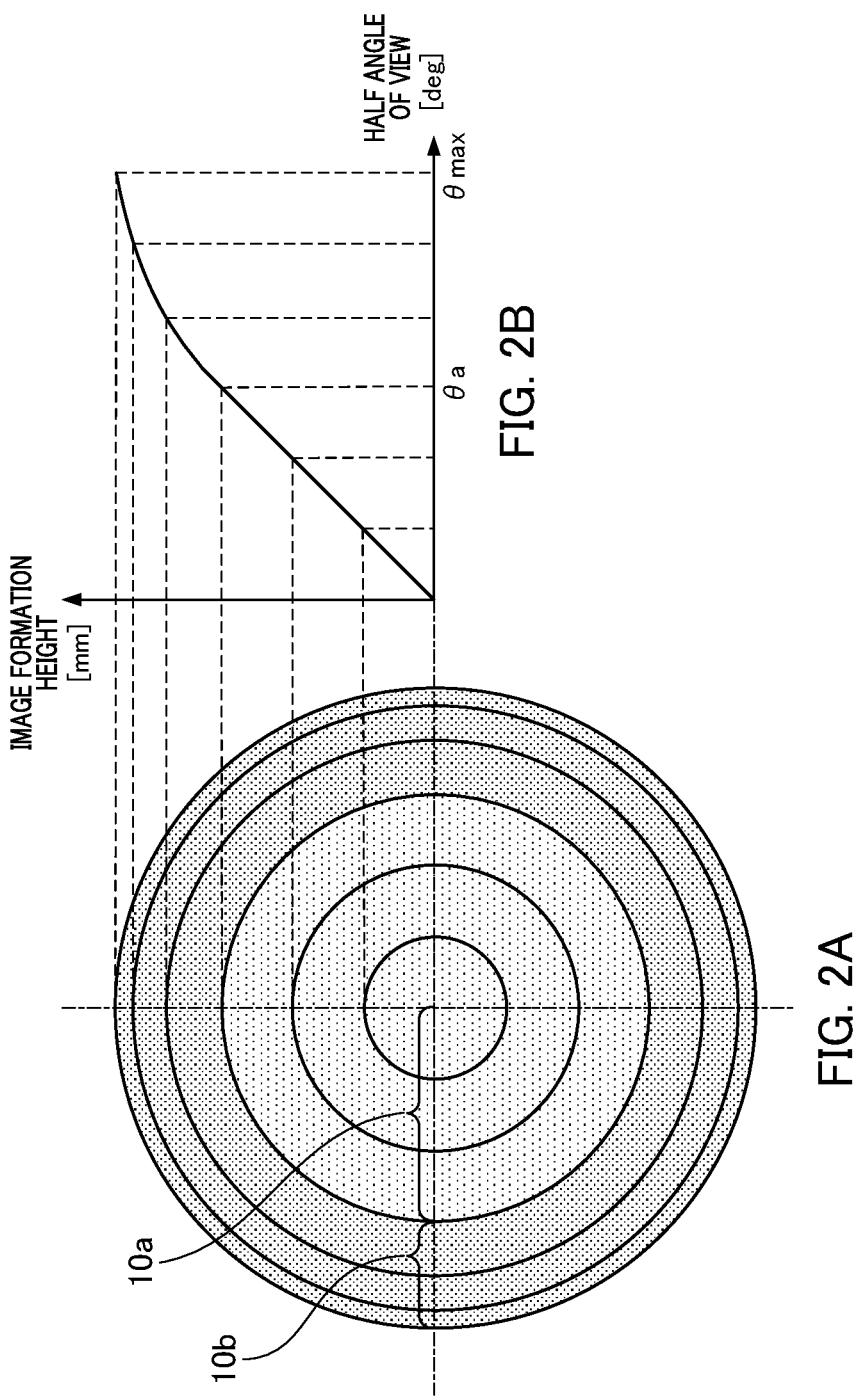
FIGS. 2A and 2B are diagrams illustrating optical characteristics of an imaging unit in First Embodiment.

The present invention is not limited to the projection characteristic illustrated in FIG. 2 because the same effect can be obtained as long as the projection characteristic y(θ) satisfies the condition of Equation 1 above. In First Embodiment, an optical system having the projection characteristic y(θ) that satisfies the condition of Equation 1 described above may be referred to as a different-angle-of-view lens.

The high-resolution areas 10a of the optical systems of the respective camera units 11 to 14 correspond to the imaging angles of view 11a to 14a, and the angles of view including the imaging angles of view 11a to 14a and the low-resolution area 10b correspond to the imaging angles of view 11b to 14b.

As described above, in First Embodiment, an approximate center of the light reception surface of the image sensor of the camera units 11 to 14 and a centroid of the high-resolution area 10a (the optical axis of the optical system) substantially overlap, and the centroid of the high-resolution area 10a matches the position at which the optical axis of the optical system intersects the light reception surface.

However, for example, the approximate center of the light reception surface of the image sensor and the centroid of the high-resolution area 10a (the optical axis of the optical system) may be shifted in a predetermined direction (a first direction). Further, the centroid of the high-resolution area 10a may be shifted from the position at which the optical axis of the optical system intersects the light reception surface.

Figure 3:
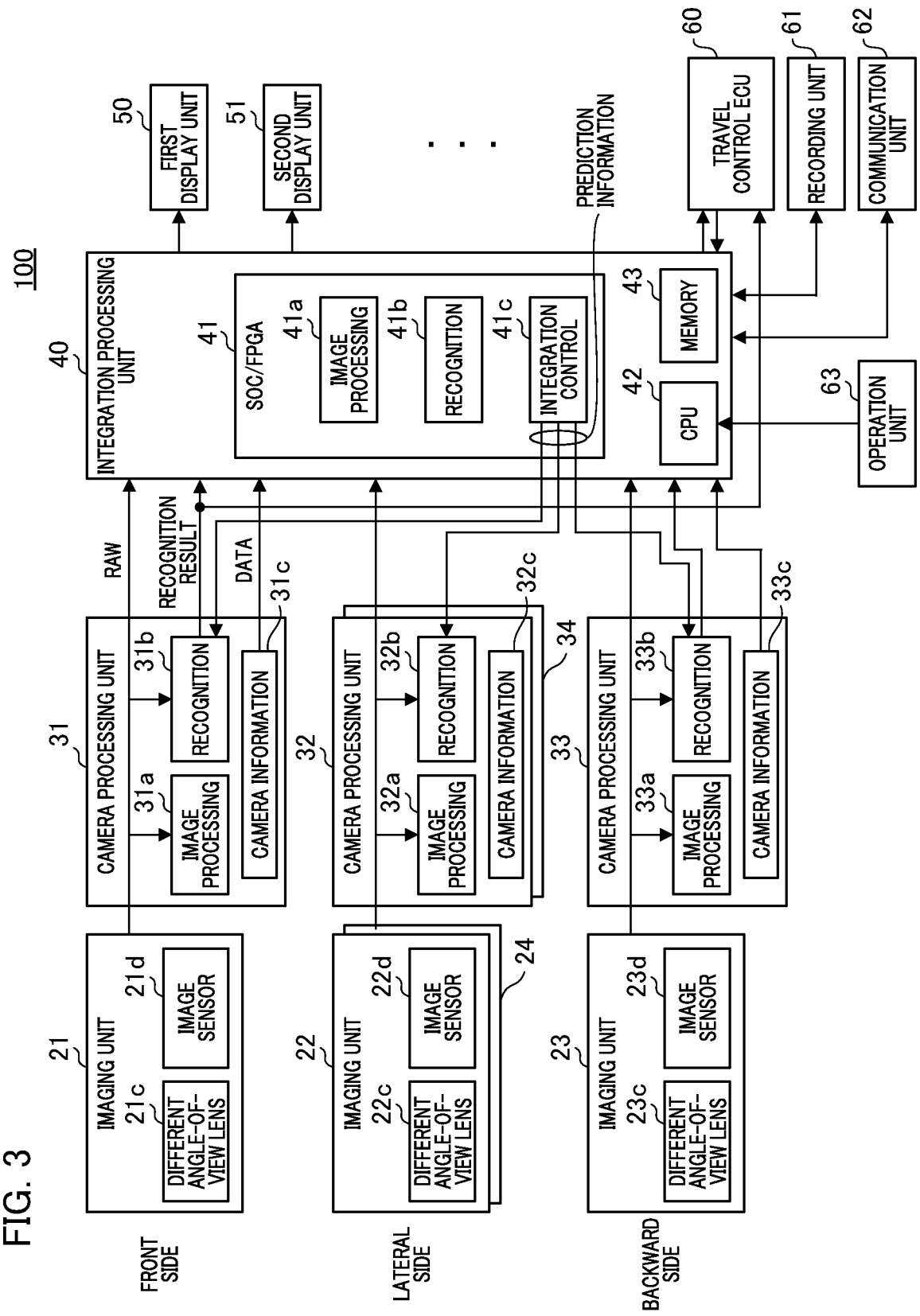
FIG. 3 is a functional block diagram illustrating a configuration of an image processing system in First Embodiment.

Next, a configuration of the image processing system in First Embodiment will be described using FIG. 3. FIG. 3 is a functional block diagram illustrating the configuration of the image processing system in First Embodiment.

In FIG. 3, an image processing system 100 is mounted in the vehicle 1 serving as a movable apparatus, and imaging units 21 to 24 and camera processing units 31 to 34 are disposed in housings of camera units 11 to 14, respectively.

The imaging units 21 to 24 include different-angle-of-view lenses 21c to 24c and image sensors 21d to 24d such as CMOS image sensors or CCD image sensors, respectively.

The different-angle-of-view lenses 21c to 24c serving as optical systems are configured of one or more optical lenses, have the projection characteristic y(θ) that satisfies the condition of Equation 1, and form an optical image having a low-distortion area and a high-distortion area on the light reception surfaces of the image sensors 21d to 24d, respectively.

The image sensors 21d to 24d function as imaging units, photoelectrically convert optical images, and output imaging signals. RGB color filters, for example, are arranged for each pixel on the light reception surfaces of the image sensors 21d to 24d. An RGB array is, for example, a Bayer array.

Therefore, from the image sensor, signals of R, G, R, and G are sequentially output from a predetermined row, and signals of G, B, G, and B are sequentially output from an adjacent row according to the Bayer array.

31 to 34 denote the camera processing units, which are housed in the same housings of the camera units 11 to 14 together with the imaging units 21 to 24, respectively, and process imaging signals output from the imaging units 21 to 24, respectively. In FIG. 3, details of the imaging unit 24 and the camera processing unit 34 and wiring thereof are omitted for the sake of convenience.

The camera processing units 31 to 34 include image processing units 31a to 34a, recognition units 31b to 34b, and camera information units 31c to 34c, respectively. The image processing units 31a to 34a perform image processing on the imaging signals output from the respective imaging units 21 to 24. A part or all of the camera processing unit 31 may be realized by stacked signal processing units in the image sensors 21d to 24d.

Specifically, the image processing units 31a to 34a perform a de-Bayer process on image data input from the imaging units 21 to 24 according to the Bayer array, and convert the data into RGB raster format image data. Further, various types of correction processing such as white balance adjustment, gain/offset adjustment, gamma processing, color matrix processing, or reversible compression processing are performed. However, irreversible compression processing or the like is not performed to form a so-called RAW image signal.

The recognition units 31b to 34b perform image recognition of a predetermined target object (for example, a car, a person, or an obstacle) from the RAW image signals not subjected to the distortion correction, which has been subjected to image processing by the image processing units 31a to 34a. That is, the recognition units 31b to 34b perform image recognition in a state of the RAW image signal without performing the distortion correction on the image signal corresponding to the low-distortion area, and output a first image recognition result.

The recognition units 31b to 34b of First Embodiment perform image recognition processing on at least the RAW image signal obtained from the high-resolution area 10a, and recognize the predetermined target object. In this case, the recognition units 31b to 34b may also perform the image recognition processing on the RAW image signal obtained from the low-resolution area 10b. However, since the RAW image signal is not subjected to the distortion correction, an image of a peripheral portion of the different-angle-of-view lens is greatly distorted, and the reliability of recognition is lowered.

Alternatively, the recognition units 31b to 34b may cut out the RAW image signal obtained from the high-resolution area 10a and perform the image recognition processing only on the RAW image signal obtained from the high-resolution area 10a.

In this case, it is preferable for an area cut out for image recognition to be a rectangle, which is a shape suitable for image recognition processing. Further, the rectangular area that is cut out may be only a portion of the high-resolution area 10a (for example, a rectangle inscribed in the high-resolution area 10a), or may be a rectangle including both the high-resolution area 10a and the low-resolution area 10b.

Here, the recognition units 31b to 34b function as a first image recognition unit that performs image recognition on the basis of an image signal of at least a partial area among the image signals acquired by the imaging unit, and outputs the first image recognition result. In First Embodiment, the partial area is an area corresponding to the low-distortion area.

The recognition units 31b to 34b transmit a set of type and coordinates of the target object to the integration processing unit 40 as a recognition result.

On the other hand, the recognition units 31b to 34b receive prediction information, which is a set of a type of target object and information on a moving direction of the target object or priority recognition area information, from the integration control unit 41c of the integration processing unit 40. This prediction information will be described below.

Here, an output of the recognition unit 31b of the camera unit 11 installed in front of the vehicle 1 is also directly supplied to the travel control unit (ECU) This is because it may be necessary to immediately stop traveling on the basis of a result of recognizing an obstacle or the like in the recognition unit 31b, or to control the traveling to avoid the obstacle.

The camera information units 31c to 34c hold camera information on the camera units 11 to 14 in memories in advance, respectively. The camera information unit can also temporarily hold information from various sensors or the like provided in the camera units 11 to 14. The camera information includes, for example, characteristic information (resolution boundary information, or the like) as illustrated in FIG. 2, of optical images formed by the different angle-of-view lenses 21c to 24c.

The camera information also includes the number of pixels of the image sensors 21d to 24d, attachment position coordinates and posture (pitch, roll, yaw, or the like) information at vehicle coordinates of the camera unit, an imaging direction, and the like. The camera information may include information such as gamma characteristics, sensitivity characteristics, and frame rate. Further, the camera information may include information on an image processing method or image format if generating a RAW image signal in the image processing units 31a to 34a.

Since the attachment position coordinates may be stored in the memory in the camera information unit in advance since an attachment position of each camera unit to the vehicle is determined in many cases. Further, posture coordinates of the camera unit are coordinates relative to the vehicle 1, and may be acquired from an encoder (not illustrated) provided in the camera unit. Alternatively, posture coordinates may be acquired using a three-dimensional acceleration sensor or the like.

Further, information on the imaging direction may be acquired by using, for example, a geomagnetic sensor. Since the resolution boundary information of the camera is determined according to a lens design, it is assumed that the resolution boundary information is stored in the memory in the camera information unit in advance.

The camera information is unique information of the imaging units 21 to 24 and is different from each other, and the information is transmitted to the integration processing unit 40 and referred to if the integration processing unit 40 performs image processing or the like. Here, the camera information units 31c to 34c function as holding units that hold characteristic information on characteristics of the optical image or position posture information of the camera unit.

a CPU serving as a computer or a memory that stores a computer program serving as a storage medium is embedded in the camera processing units 31 to 34. Further, the CPU is configured to control respective units in the camera processing units 31 to 34 by executing the computer program in the memory.

In First Embodiment, for the image processing units 31a to 34a or the recognition units 31b to 34b, hardware such as dedicated circuits (ASIC) or a processor (a reconfigurable processor or a DSP) is used. This makes it possible to realize high-speed image recognition in the high-resolution area, and increase a possibility of accident avoidance. The image processing units 31a to 34a may have a distortion correction function.

Some or all of functional blocks inside the camera processing units 31 to 34 may be realized by causing the CPU to execute the computer program stored in the memory, and in this case, it is preferable to increase a processing speed of the CPU.

40 is an integration processing unit, which includes a system on chip (SOC)/field programmable gate array (FPGA) 41, a CPU 42 serving as a computer, and a memory 43 serving as a storage medium.

The CPU 42 performs various controls of the entire image processing system 100 by executing a computer program stored in the memory 43. in First Embodiment, the integration processing unit 40 is housed in a housing separate from the camera unit.

The SOC/FPGA 41 includes an image processing unit 41a, a recognition unit 41b, and an integration control unit 41c. The image processing unit 41a acquires the respective RAW image signals from the camera processing units 31 to 34, and acquires the camera information of the respective camera units 11 to 14 from the camera information units 31c to 34c.

The camera information includes optical characteristics of the different angle-of-view lenses 21c to 24c, the number of pixels of the image sensors 21d to 24d, photoelectric conversion characteristics, y characteristics, sensitivity characteristics, RAW image signal format information, and coordinates of an attachment position at vehicle coordinates or posture information of the camera unit, as described above.

The image processing unit 41a acquires the camera information such as characteristic information of the optical system. Resolution conversion is performed on the RAW image signals from the camera processing units 31 to 34 on the basis of the camera information, and an image processing step such as the distortion correction is executed for the image signals obtained from the low-resolution areas 10b of the imaging units 21 to 24.

That is, the distortion correction is performed on the image signal in the distortion correction area on the basis of characteristics of the optical image, and the image signal subjected to the distortion correction is synthesized with an image signal in a non-distortion correction area not subjected to the distortion correction so that a synthesis image is generated. That is, the image processing unit 41a also functions as a display signal generation unit, and performs the distortion correction or the like to perform a display signal generation step for generating the synthesis image. The distortion correction area can be set by the user or automatically in First Embodiment.

In First Embodiment, the image processing unit 41a does not perform the distortion correction because the image signal obtained from the high-resolution area has substantially no distortion. However, the image processing unit 41a may also perform simple distortion correction on the image signal obtained from the high-resolution area 10a. Further, the image processing unit 41a appropriately performs the irreversible compression processing or the like on each of the RAW image signals from the camera processing units 31 to 34.

Further, the image processing unit 41a synthesizes the image signals of the low-resolution areas 10b and the image signals of the high-resolution areas 10a of the imaging units 21 to 24 subjected to the distortion correction to smoothly splice these and form all the images of the imaging units 21 to 24.

When the distortion correction is performed on both the image signal of the low-resolution area 10b and the image signal obtained from the high-resolution area the RAW image signals obtained by the image processing units 31a to 34a may be subjected to the distortion correction as they are.

The image processing unit 41a performs image processing such as image rotation on the basis of particularly a disposition position and posture information of the camera in the camera information. This will be described below.

The recognition unit 41b performs the image recognition processing on all the images of the imaging units 21 to 24 after at least the distortion correction is performed on the low-resolution area to perform image recognition of the predetermined target object (for example, a car, people, or obstacle) in all the images of the imaging units 21 to 24. That is, the recognition unit 41b performs image recognition to outputs a second image recognition result after the distortion correction has been performed on the image signal corresponding to at least the low-resolution area (high-distortion area).

In this case, the recognition result (the type and coordinates of the target object) of the recognition units 31b to 34b is also referred to. In First Embodiment, the recognition unit 41b performs image recognition on all the images of the imaging units 21 to 24, but may not necessarily perform the image recognition on all the images. For example, the image recognition may not be performed on a peripheral portion of the image.

That is, the recognition unit 41b may recognize a wider area, including, for example, the areas recognized by the recognition units 31b to 34b.

That is, the recognition unit 41b functions as a second image recognition unit that performs image recognition on the image signal of an area wider than the partial area, including the partial area subjected to image recognition by the first image recognition unit, among the image signals acquired by the image acquisition unit, and outputs the second image recognition result.

The second image recognition unit performs image recognition on a synthesis image obtained by synthesizing the image signals corresponding to the high-resolution area 10a serving as the low-distortion area and the low-resolution area 10b serving as the high-distortion area, and outputs the second image recognition result.

In First Embodiment, the image processing unit 41a synthesizes the images from the camera units 12 to 14 serving as a plurality of imaging units to splice the images and form a panoramic synthesis image.

In this case, it is preferable for the images of the plurality of imaging units to be spliced to be set so that at least parts of respective photographing angles of view have a predetermined amount or more of overlapping area.

In First Embodiment, the camera units 12 and 13 are disposed so that photographing ranges overlap each other. Further, the camera units 13 and 14 are disposed so that photographing ranges overlap each other. Further, in this case, the camera units 12 and 13 are disposed so that photographing ranges of the low-distortion areas of at least two image acquisition units overlap each other.

Further, the recognition unit 41b performs image recognition on the panoramic synthesis image. This makes it possible to perform image recognition of a target object photographed to straddle angles of view of the plurality of imaging units. That is, this is because there is a case in which the entire image of the target object is not known and image recognition cannot be performed from all individual images from the respective imaging units, but there is a case in which, in the panoramic synthesis image, the substantially entire target object can be captured and the image recognition can be performed by image processing.

For example, if recognition results of the recognition units 31b to 34b differ from a recognition result of the recognition unit 41*b*, the integration control unit 41*c* outputs an image recognition result integrated by adopting a recognition result of the higher reliability side.

For example, an occupying proportion of the target object within the image recognized by the recognition units 31*b* to 34*b* is compared with a proportion of the same target object recognized by the recognition unit 41*b* closed within the screen, and a recognition result of the larger ratio side is determined to be more reliable and adopted.

Alternatively, in the case of a target object straddling both the high-resolution area and the low-resolution area, the recognition result of the recognition unit 41*b* may be determined to be more reliable than the recognition results of the recognition units 31*b* to 34*b*, and adopted. Alternatively, if positions of the target object recognized by the recognition units 31*b* to 34*b* are peripheral portions of the screen, a determination may be made that the reliability is low, and the recognition result of the recognition unit 41*b* may be determined to be more reliable, and adopted.

Alternatively, the recognition unit 41*b* may perform the image recognition only in the low-resolution area in a state in which the distortion correction has been performed on the low-resolution area, and perform the image recognition on a target object if the target object straddles the low-resolution area and the high-resolution area. Further, the reliability of the recognition in the recognition units 31*b* to 34*b* may be regarded as being high for a target object present only in the high-resolution area, and control may be performed so that the recognition unit 41*b* does not perform the image recognition processing.

Here, the integration control unit 41*c* functions as an integration processing unit that outputs an image recognition result integrated on the basis of the reliability of the first image recognition result and the reliability of the second image recognition result.

Further, the integration control unit 41*c* forms a signal for displaying a desired image among all the images of the imaging units 21 to 24 and the panoramic synthesis image on a first display unit 50, a second display unit 51, or the like. Further, a CG for information or warning regarding a frame for highlighting the recognized target object, and a type, size, position, speed, or the like of the target object, for example, is generated.

Further, a CG of the boundary image for displaying the boundary may be generated on the basis of the characteristic information of the optical system such as display resolution boundary information acquired from the camera information units 31*c* to 34*c*.

Further, display processing for superimposing the CG or characters on the image, or the like is performed. Here, the first display unit 50, the second display unit 51, or the like can execute a display step of displaying the image signal or the integrated image recognition result.

Further, in First Embodiment, the integration control unit 41*c* is configured to share the information on recognized target object among the plurality of camera units. That is, it is assumed that, for example, it is recognized that the target object recognized by the camera unit 14 is moving in a direction of the angle of view of the camera unit 11.

In this case, the integration control unit 41*c* transmits the prediction information including the information on the type of the target object and the information on the moving direction of the target object or the priority recognition area information to the recognition unit 31*b* of the camera unit 11.

Such prediction information is shared among the recognition units 31*b* to 34*b* of the camera units 11 to 14, making it possible to improve the accuracy of the image recognition in the recognition units 31*b* to 34*b* of the camera units 11 to 14. An advantage of sharing such prediction information is particularly large if the recognition units 31*b* to 34*b* of the camera units 11 to 14 are separate from the recognition unit 41*b* of the integration processing unit 40.

Further, the integration control unit 41*c* performs communication with the travel control unit (ECU) 60 or the like via a communication unit (not illustrated) provided therein using protocols such as CAN, FlexRay, or Ethernet. Accordingly, display processing for appropriately changing information to be displayed on the basis of a vehicle control signal received from the travel control unit (ECU) 60 or the like is performed. That is, for example, a range of an image displayed on the display unit is changed according to a moving state of the vehicle acquired by the vehicle control signal.

The travel control unit (ECU) 60 is mounted on the vehicle 1 and is a unit in which a computer or memory for comprehensively performing driving control, direction control, and the like of the vehicle 1 is embedded. Information on travel (the moving state) of the vehicle, such as a travel speed, travel direction, shift position of a shift lever, a state of a turn signal, and a direction of the vehicle detected by a geomagnetic sensor or the like, for example, is input as the vehicle control signal from the travel control unit (ECU) 60 to the integration processing unit 40.

On the other hand, the integration control unit 41*c* transmits information such as a type, position, moving direction, or moving speed of the predetermined target object (such as an obstacle) recognized by the recognition unit 41*b* to the travel control unit (ECU) 60. Accordingly, the travel control unit (ECU) 60 performs control necessary for obstacle avoidance or the like, such as stopping the vehicle, driving the vehicle, and changing a direction of travel. Here, the travel control unit (ECU) 60 functions as a movement control unit that controls the movement of the vehicle serving as a movable apparatus on the basis of the integrated image recognition result.

The first display unit 50 is installed, for example, near a center in a vehicle width direction above the front of a driver seat of the vehicle 1 with a display screen directed to a rearward side of the vehicle, and functions as an electronic rearview mirror. A half mirror or the like may be used, and may be used as a mirror when the half mirror is not used as a display for image display.

Further, the first display unit 50 may be configured to include a touch panel or operation buttons, acquire instructions from the user, and be able to output the instructions to the integration control unit 41*c*. Further, the first display unit 50 can be used as an electronic side mirror for confirming obstacles on the left and right, instead of an optical side mirror of the related art.

The second display unit 51 is installed near an operation panel near the center in the vehicle width direction in front of the driver seat of the vehicle 1, for example. A navigation system, an audio system, and the like (not illustrated) are mounted on the vehicle 1 serving as a movable apparatus.

Further, for example, various control signals from the navigation system, the audio system, and the travel control unit (ECU) 60 can be displayed on the second display unit. Further, a touch panel or operation buttons are included to be able to acquire instructions from the user.

The second display unit 51 may be, for example, a display unit of an external tablet terminal, and may be connected to the integration processing unit 40 by wire to be able to display an image or may be able to receive an image wirelessly via a communication unit 62 and display the image. As a display panels for the first display unit 50 and the second display unit 51, a liquid crystal display, an organic EL display, or the like can be used. The number of display units is not limited to three.

Some or all of functional blocks included in the integration processing unit 40 or the like may be realized by hardware, or may be realized by causing the CPU 42 to execute a computer program stored in the memory 43. As hardware, a dedicated circuit (ASIC), a processor (a reconfigurable processor or DSP), or the like can be used.

A part or all of the image processing performed by the image processing units 31a to 34a may be performed by the image processing unit 41a of the integration processing unit 40. That is, in First Embodiment, for example, the image acquisition unit and the first image recognition unit are housed in the same housing of the camera unit, and the camera unit and the second image recognition unit are housed in separate housings. However, for example, the first image recognition unit and the second image recognition unit may be housed in the housing of the integration processing unit 40.

In First Embodiment, the integration processing unit 40 is installed in the vehicle 1 serving as a movable apparatus, but the processing of some of the image processing unit 41a, the recognition unit 41b, and the integration control unit 41c of the integration processing unit 40 may be performed by an external server or the like through a network, for example.

In this case, for example, the imaging units 21 to 24 serving as image acquisition units are mounted on the vehicle 1 serving as a movable apparatus, but for example, some of the functions of the camera processing units 31 to 34 or the integration processing unit 40 can be processed by an external server or the like. Further, it is possible to cause the travel control unit (ECU) 60 to have some or all of the functions of the integration processing unit 40.

61 denotes the recording unit, which records all the images of the imaging units 21 to 24 generated by the integration processing unit 40 or the panoramic synthesis image. Further, a CG of a predetermined frame, character, and warning indicating the recognized target object, and an image superimposed with CG and displayed on the first display unit 50, the second display unit 51, or the like is recorded together with a time or the like or GPS information or the like.

The integration processing unit 40 can also reproduce past information recorded in the recording unit 61 and display the past information on the first display unit 50 or the second display unit 51.

62 denotes a communication unit and is used to communicate with an external server or the like via a network, and can transmit information before being recorded in the recording unit 61 or the past information recorded in the recording unit 61 to the external server or the like and store the information in the external server or the like.

Further, as described above, the image can be transmitted to an external tablet terminal or the like and displayed on the second display unit 51, which is a display unit of the tablet terminal. Further, it is possible to acquire traffic information and various types of information from an external server or the like and display the information on the first display unit 50 or the second display unit 51 via the integration processing unit 40.

63 denotes an operation unit, which is used to input various instructions to the image processing system according to an operation of the user. The operation unit includes, for example, a touch panel or operation buttons.

Figure 4:
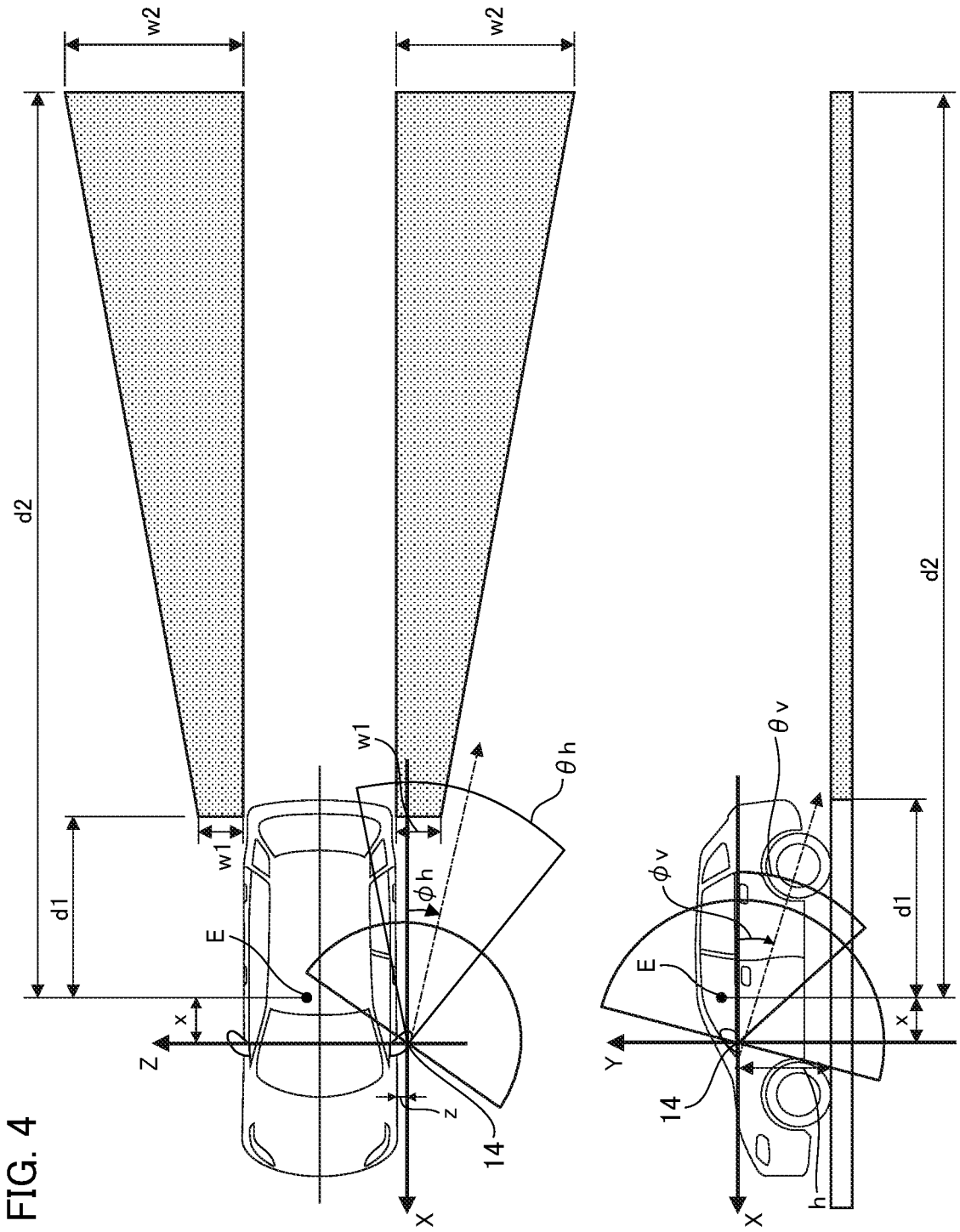
FIG. 4 is a diagram illustrating conditions for installing a camera unit in a vehicle 1 in First Embodiment.

FIG. 4 is a diagram illustrating conditions for installing the camera unit in the vehicle 1 in First Embodiment.

In FIG. 4, 14 is a camera unit installed on the left lateral side, which captures an image for an electronic side mirror display.

Further, in order for the driver to confirm the safety of the surroundings of the vehicle through the display of the electronic side mirror, it is necessary to display an area on the ground on the lateral side or rearward side of the vehicle as shown as a shaded area in FIG. 4. Hereinafter, in First Embodiment, the shaded area in FIG. 4 is also referred to as a defined area. In FIG. 4, an area with a width w1 at a distance d1 behind a viewpoint position E of the driver and an area on the ground with a width w2 at a distance d2 are defined as defined areas.

It is preferable for this defined area to be displayed on the first display unit 50. That is, d1 and d2 are distances behind the viewpoint position E of the driver in an X direction in FIG. 4, and w1 and w2 are widths on the ground at the distances d1 and d2, respectively.

In order to display the defined area illustrated in FIG. 4, it is necessary to install at least the defined area so that the defined area is included in an imaging area of the camera unit 14. Therefore, in First Embodiment, the camera unit 14 is installed to be able to image the defined area at an imaging angle of view corresponding to the high-resolution area 10a that satisfies the condition of Equation 1.

Further, it is assumed that, in FIG. 4, the camera unit 14 is disposed at an intersection of an X-axis, a Y-axis, and a Z-axis, and has an imaging angle of view as illustrated in FIG. 4.

Here, in order to form an image for a side mirror to display the defined area using the high-resolution area 10a that satisfies the condition of Equation 1, it is preferable for the camera unit 14 to be installed in a vertical direction to satisfy a condition of Equation 2 below $$A \tan(h/(d1+x)) - \theta v/2 < \phi v < A \tan(h/(d2+x)) + \theta v/2 \quad \text{(Equation 2)}$$

Further, it is preferable to install the camera unit 14 in the horizontal direction so that conditions of Equations 3 and 4 below are satisfied.

$$\Phi h\_limit = \max(A \tan((w1-z)/(d1+x)) - \theta h/2, A \tan((w2-z)/(d2+x)) - \theta h/2) \quad \text{(Equation 3)}$$

$$\Phi h\_limit < \phi h < -A \tan(z/(d1+x)) + \theta h/2 \quad \text{(Equation 4)}$$

Here, as illustrated in FIG. 4, $\theta v$ is a vertical angle of view of the high-resolution area 10a, $\theta h$ is a horizontal angle of view of the high-resolution area 10a, $\phi v$ is a vertical direction angle of the optical axis of the optical system of the camera unit 14, and $\phi h$ is a horizontal angle of the optical axis of the optical system of the camera unit 14.

Further, x is an offset between the viewpoint position E of the driver and the camera unit 14 in a long axis direction (the X direction in FIG. 4) of the vehicle 1, and z is an offset in a short axis direction (a Z direction in FIG. 4) of the camera unit 14 from the lateral side of the vehicle. Further, h is an offset in a height direction (a Y direction in FIG. 4) of the camera unit 14 from the ground.

It is assumed that the viewpoint position E of the driver is a position of the eye at a seating position of the driver or a center position of a seat surface of the driver.

Although the installation conditions for the camera unit 14 on the left lateral side have been described above, the same conditions apply to the camera unit 12 on the right lateral side.

All the conditions of Equations 1 to 4 are satisfied as described above, making it possible to cause the defined area in which the driver should confirm safety as illustrated in FIG. 4 to be included within the angle of view of the high-resolution area 10a and perform imaging. Therefore, it is possible to appropriately display a high-resolution and low-distortion image using the electronic side mirror.

Thus, in First Embodiment, the conditions of Equations 1 to 4 above are satisfied, making it possible to cause the defined area on the rearward lateral side of the vehicle at the angle of view of the high-resolution area 10a to be included in the imaging range.

Therefore, it is possible to display the defined area on the rearward lateral side of the vehicle on the electronic side mirrors, allowing the driver to confirm safety. Further, since the high-resolution area 10a has a small distortion and a high resolution, the driver can timely visually observe an obstacle or the like with the high-resolution and low-distortion image.

Further, the image recognition is performed in a state of the RAW image signal for the high-resolution area 10a, making it possible to perform image recognition without delay, and thus, to promptly notify the driver of information on an obstacle or the like. Further, the conditions of Equations 1 to 4 above are satisfied as described above, making it possible for the car to display a video allowing the driver to easily confirm safety on the electronic side mirror.

As described above, in First Embodiment, the high-resolution area (low-distortion area) 10a has a characteristic close to the central projection scheme (that is, if $y=f\times\tan\theta$) that is a projection characteristic of an optical system for normal imaging or the equidistant projection scheme (that is, if $y=f\times\theta$).

Therefore, the optical distortion is small and high-resolution display becomes possible. Further, a natural perspective at the time of visually observing nearby vehicles or the like can be obtained. Further, it is possible to obtain good visibility by suppressing deterioration of image quality, and to perform image recognition without the distortion correction.

Even if the projection characteristic $y(\theta)$ does not satisfy the condition of Equation 1 described above, the optical system forms an optical image having the high-resolution area 10a and the low-resolution area 10b, and may be installed to satisfy the conditions of Equations 2 to 4. In this case, it is also possible to visually observe an image with a somewhat high resolution and low distortion or perform image recognition.

For example, in the case of a passenger car with nine passengers or less or a small freight vehicle (for example, a vehicle weight of 3.5 tons or less), it is preferable for the driver to confirm a defined area with d1=4 m, w1=1 m, d2=20 m, and w2=4 m with the electronic side mirror.

In this case, it is assumed that, for example, a camera unit in which each of a vertical angle of view $\theta v$ and a horizontal angle of view $\theta h$ of the high-resolution area 10a is 47.2 degrees is used, and the camera unit is installed at a position of x1=0.5 m, z=0.2 m, and h1=1 m.

In this case, the vertical direction angle $\phi v$ and the horizontal angle $\phi h$ of the optical axis of the camera unit are $-11.07°<\phi v<26.4°$ and $-13.1°<\phi h<26.1°$, respectively. The camera unit is installed according to the optical axis of the camera to satisfy these conditions.

Further, in the case of a passenger car with 10 or more passengers, or a medium or large freight vehicle, it is preferable to be able to confirm the rearward side, and thus, it is preferable for the driver to be able to confirm the defined area with d1=4 m, w1=1 m, d2=30 m, and w2=5 m with the electronic side mirror.

In this case, it is assumed that a camera unit in which each of a vertical angle of view $\theta v$ and a horizontal angle of view $\theta h$ of the high-resolution area 10a is 47.2 degrees is used, and the camera unit is installed at a position of x1=0.5 m, z=0.2 m, and h=1 m. Then, the vertical direction angle $\phi v$ and the horizontal angle $\phi h$ of the optical axis of the camera unit are $-11.1°<\phi v<25.5°$ and $-13.5°<\phi h<26.1°$, respectively.

In the above-described numerical examples, an installation position (x, z, h) of the camera unit has been set as a fixed condition, and an angle condition of the optical axis of the camera unit has been calculated, but the conditions of Equations 2 and 3 may be satisfied and a method for calculating the installation condition is not limited thereto. For example, if an angle of the optical axis of the camera unit is determined in advance as constraints of a vehicle design, a range of the installation position of the camera unit satisfying the conditions of Equations 2 and 3 is determined on the basis of the angle.

This makes it possible to cause the defined area to be included in the imaging range of the high-resolution area of the camera unit. When the installation position (x, z, h) of the camera unit and the angle of the optical axis of the camera unit are determined in advance as constraints on both designs, the vertical angle of view $\theta v$ and the horizontal angle of view $\theta h$ of the high-resolution area 10a of the camera unit satisfying the conditions of Equations 2 and 3 may be determined on the basis of the constraints.

Second Embodiment

In Second Embodiment, installation conditions if a camera unit is installed in a medium freight vehicle will be described. It is assumed that the medium freight vehicle is, for example, a vehicle having a gross vehicle weight more than 3.5 tons and less than or equal to 12 tons.

The medium freight vehicle may be a vehicle more than 3.5 tons and less than or equal to 7.5 tons. In a medium freight vehicle, a driver needs to confirm safety in a wider range in a lateral direction as compared with a passenger car or a small freight vehicle.

Figure 5:
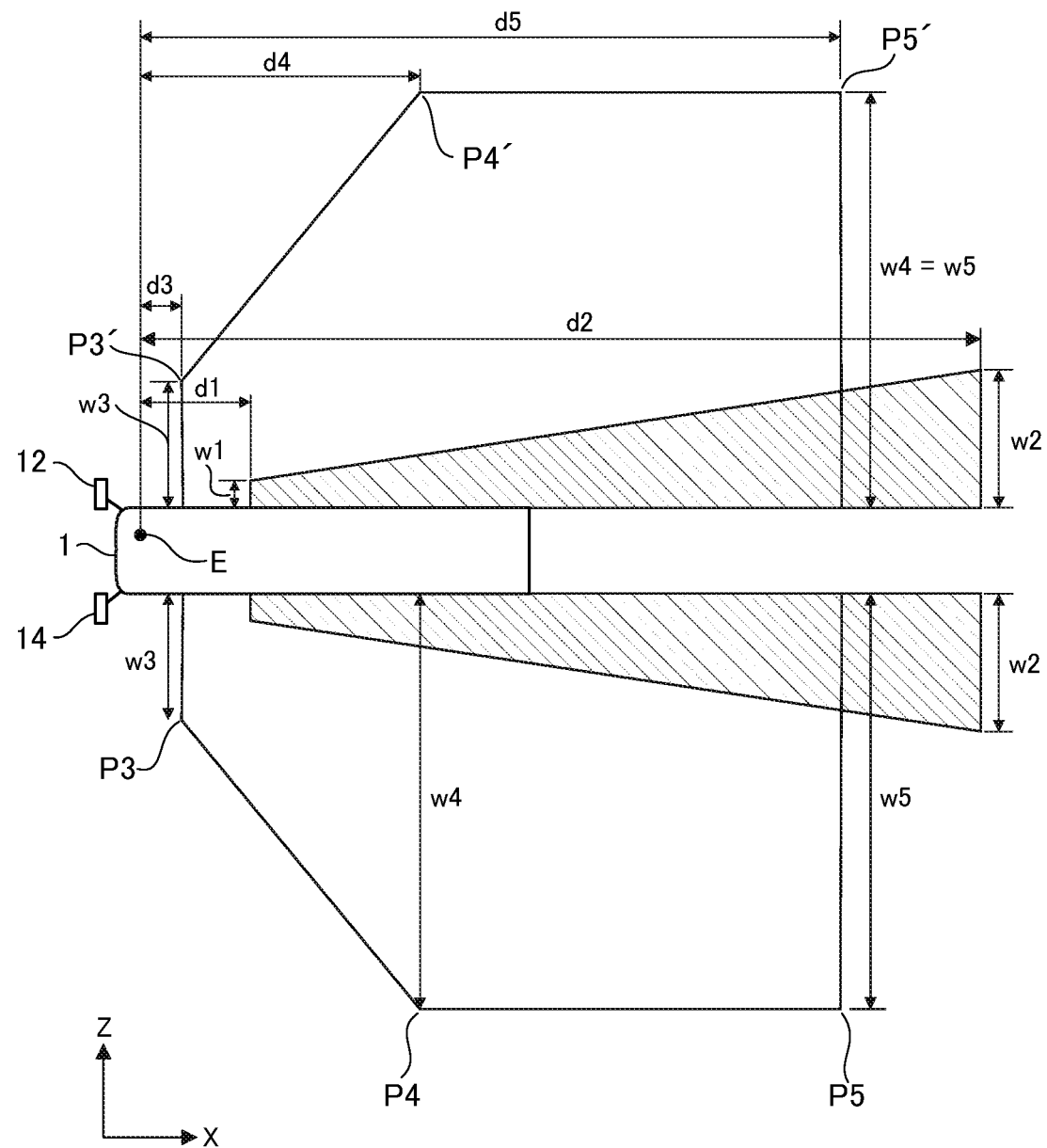
Figure 6:
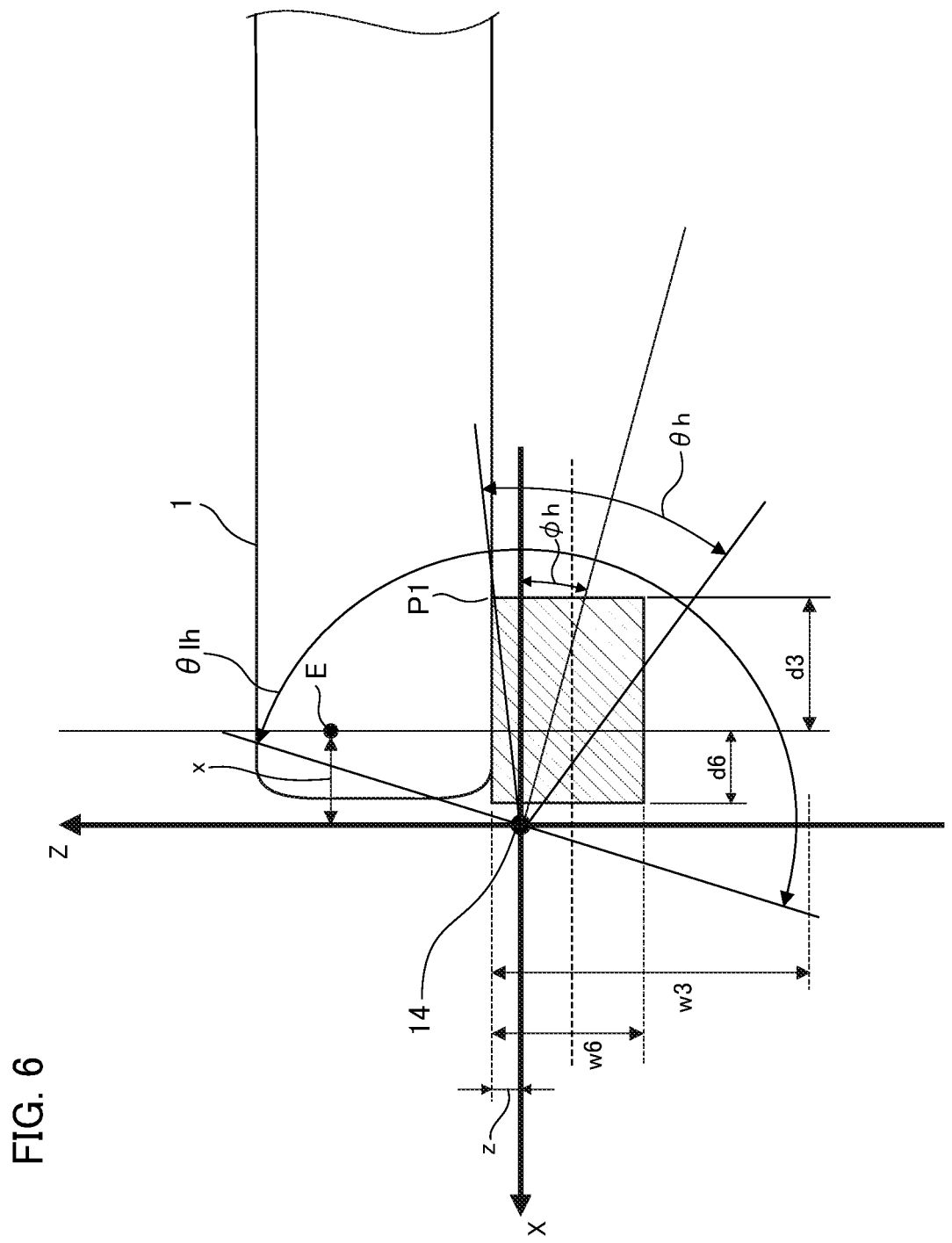
FIG. 6 is an enlarged view of a part of FIG. 5.
Figure 7:
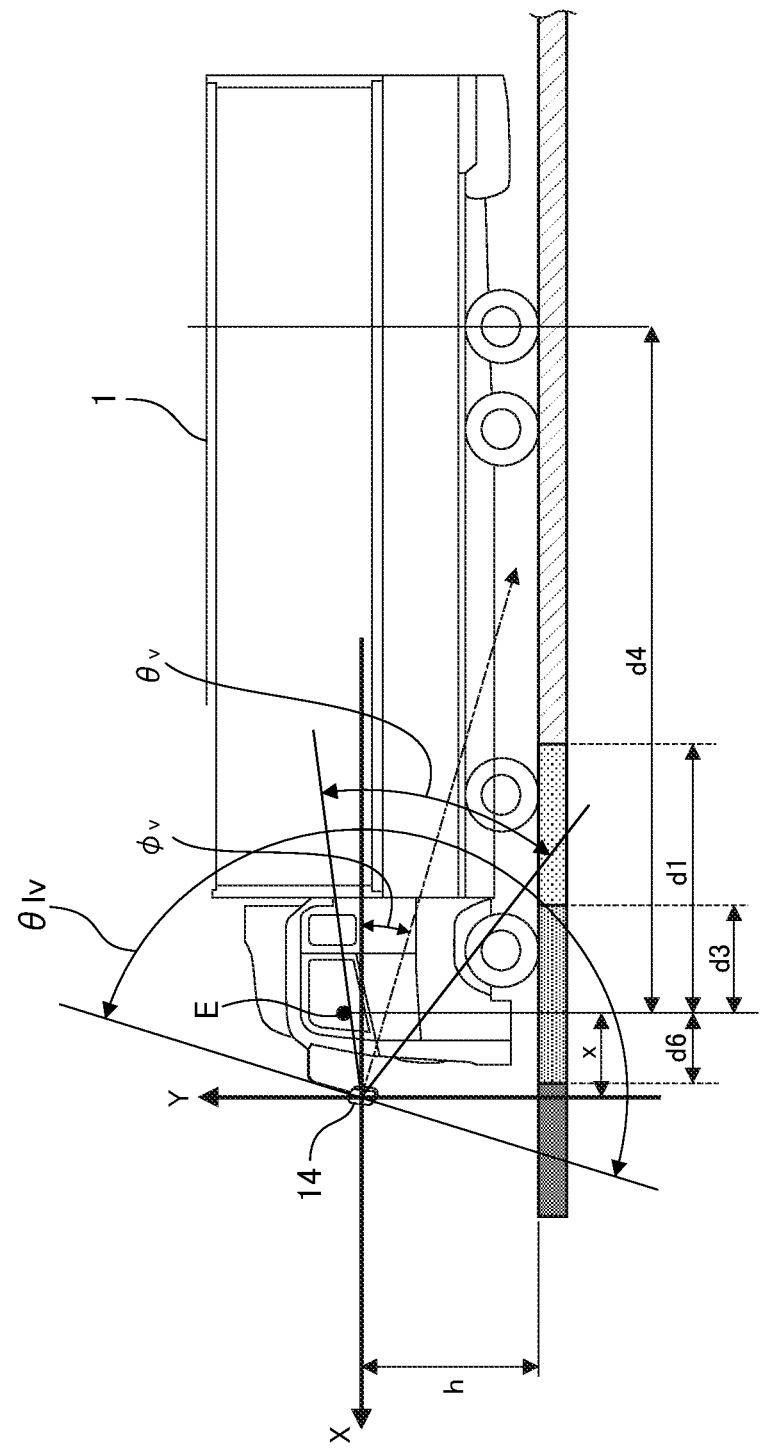
FIG. 7 is a side view of the medium freight vehicle of FIG. 6.

FIG. 5 is a diagram illustrating an example of defined areas and camera unit installation conditions in a medium freight vehicle or the like, and FIG. 6 is an enlarged view of a part of FIG. 5. Further, FIG. 7 is a side view of the medium freight vehicle of FIGS. 5 and 6. As illustrated in FIGS. 5 to 7, it is preferable for the distances d1 to d6 from the viewpoint position E of the driver and the widths w1 to w6 corresponding to the respective distances to be displayed on the electronic side mirrors so that the driver can confirm these.

Areas defined by d1 to d6 and the widths w1 to w6 corresponding to the respective distances are described as defined areas in Second Embodiment. Further, in Second Embodiment, the camera unit is installed so that all the defined area can be imaged in the high-resolution area 10a of the camera unit. In FIGS. 5, P3 to P5 correspond to P3' to P5', which are in a symmetrical relationship with respect to a center line in a long axis direction (an X direction) of the vehicle 1.

It is assumed that, as illustrated in FIG. 6, a position of the camera unit 14 installed for side mirror display is disposed in front of the viewpoint position E of the driver by x and is offset by z from the lateral side of the vehicle. As illustrated in FIG. 7, the camera unit 14 is attached to a support arm protruded obliquely forward with respect to the vehicle 1.

In Second Embodiment, in order to install the camera unit so that all of the defined areas illustrated in FIG. 5 can be imaged in the high-resolution area 10a of the camera unit, it is preferable for a position or angle of the camera unit 14 to satisfy conditions of Equations 5 to 9 below, in addition to the conditions of Equations 1 to 4.

That is, it is preferable to satisfy Equation 5 below for the vertical direction.

$$A \tan(h/(d3+x)) - \theta v/2 > \phi v \quad \text{(Equation 5)}$$

Further, it is preferable to satisfy Equation 6 below in order to image the point P1 on the vehicle body side at the distance d3 for the horizontal direction.

$$-A \tan(z/(d3+x)) + \theta h/2 > \phi h \quad \text{(Equation 6)}$$

Further, in order to image the point P3 on the outer side at the distance d3, it is preferable to satisfy Equation 7 below.

$$A \tan((w3-z)/(d3+x)) - \theta h/2 < \phi h \quad \text{(Equation 7)}$$

Further, in order to image the point P4 on the outer side at the distance d4, it is preferable to satisfy Equation 8 below.

$$A \tan((w4-z)/(d4+x)) - \theta h/2 < \phi h \quad \text{(Equation 8)}$$

Further, in order to image the point P5 on the outer side at the distance d5, it is preferable to satisfy Equation 9 below.

$$A \tan((w5-z)/(d5+x)) - \theta h/2 < \phi h \quad \text{(Equation 9)}$$

Here, d3 to d5 are distances behind a viewpoint position E of the driver for the X direction illustrated in FIG. 5, and w3 to w5 are widths extending on the outer side from the side of the vehicle 1 in a Z direction illustrated in FIG. 5.

Further, x is an offset between the viewpoint position E of the driver and the camera unit 14 in a long axis direction (an X direction in FIGS. 5 and 6) of the vehicle, and z is an offset in a short axis direction (a Y direction in FIGS. 5 to 7) of the camera unit 14 from the lateral side of the vehicle. Further, h is an offset in a height direction (a Z direction in FIG. 7) of the camera unit 14 from the ground. w4=w5 in Second Embodiment.

Third Embodiment

In Third Embodiment, installation conditions if a camera unit is installed in a large freight vehicle will be described. For example, the large freight vehicle is a vehicle having a gross vehicle weight exceeding 12 tons. The large freight vehicle may be a vehicle exceeding 7.5 tons.

The camera unit is installed so that an area with the width w1 at the distance d1, the width w2 at the distance d2, and the width w5 at the distance d5 in the defined area of Second Embodiment is included in the imaging range of the high-resolution area of the camera unit.

As installation conditions in this case, conditions of Equations 5, 6, and 9, in addition to the conditions of Equations 2 to 4 above, are satisfied. That is, the condition of Equation 5 is used for the vertical direction, a condition for imaging a point on the side of the vehicle 1 at the distance d3 is Equation 6 for the horizontal direction, and a condition for imaging the point on the outer side at the distance d5 is Equation 9.

Fourth Embodiment

In Fourth Embodiment, an area with the width w4 at distance d4 and the width w5 at d5 in the defined area of Second Embodiment is included in the imaging range of the high-resolution area of the camera unit. As installation conditions in this case, conditions of Equations 5, 6, 8, and 9, in addition to the conditions of Equations 2 to 4 above, are satisfied.

That is, the condition of Equation 5 is used for the vertical direction, the condition of Equation 6 is used to image a point on the side of the vehicle 1 at the distance d3 for the horizontal direction, the condition of Equation 8 is used to image the point on the outer side at the distance d4, and the condition of Equation 9 is used to image the point on the outer side at the distance d5.

Fifth Embodiment

In Fifth Embodiment, an area defined by the width w6 at the positions of distances d6 and d3 illustrated in FIGS. 6 and 7 can be imaged in the low-resolution area 10b, in addition to the defined area in First Embodiment. In order to confirm the ground on the side opposite to the driver seat, it is preferable to cause this defined area to be included in the imaging range.

In this case, it is preferable to satisfy conditions of Equations 10 to 16 below, in addition to the conditions of Equations 1 to 4 above. Further, in this case, the condition of any one of Second Embodiment to Fourth Embodiment may be satisfied. By doing so, it is possible to cause each defined area to be included in the imaging range with one camera unit.

That is, if x>d6, it is preferable to satisfy Equation 10 below for the vertical direction.

$$A \tan(h/(x-d6)) - \theta lv/2 < \phi v \quad \text{(Equation 10)}$$

Further, it is preferable to satisfy Equation 11 below for the horizontal direction.

$$A \tan((w6-z)/(x-d6)) - \theta lh/2 < \phi h < -A \tan(z/(x-d6)) + \theta lh/2 \quad \text{(Equation 11)}$$

Further, if x<d6,
it is preferable to satisfy Equation 12 below for the vertical direction.

$$A \tan(h/(d6-x)) + 90° - \theta lv/2 < \phi v \quad \text{(Equation 12)}$$

Further, it is preferable to satisfy Equation 13 below for the horizontal direction.

$$A \tan((w6-z)/(x-d6)) - \theta lh/2 + 90° < \phi h < -A \tan(z/(x-d6)) + \theta lh/2 - 90° \quad \text{(Equation 13)}$$

Further, if x=d6,
it is preferable to satisfy Equation 14 below for the vertical direction.

$$+90° < \phi v + \theta lv/2 \quad \text{(Equation 14)}$$

Further, it is preferable to satisfy Equation 15 below for the vehicle body side in the horizontal direction.

$$-90° > \phi h - \theta lh/2 \quad \text{(Equation 15)}$$

Further, it is preferable to satisfy Equation 16 below for the outer side in the horizontal direction.

$$+90° < \phi h + \theta lh/2 \quad \text{(Equation 16)}$$

Here, it is assumed that θlv is a vertical angle of view of the low-resolution area 10b, and θlh is a horizontal angle of view of the low-resolution area 10b.

Although the camera unit 14 on the left side has been described in First to Fifth Embodiments, the same conditions apply to the camera unit 12 on the right side.

As a specific example of the defined area of Second Embodiment to Fifth Embodiment as described above, it is preferable for the driver to be able to confirm, for example, d1=4 m, w1=1 m, d2=20 m, W2=4 m, d3=1.5 m, w3=4.5 m, d4=10 m, and w4=15 m with an electronic side mirror. Further, it is preferable for the driver to be able to confirm the defined area with d5=25 m, w5=15 m, d6=1 m, and w6=2 m with the electronic side mirrors.

For example, if the installation position of the camera unit is x=1.1 m, z=0.3 m, and h=2.3 m, the vertical direction angle φv and the horizontal angle φh of the optical axis of the camera unit are $0.67°<φv<17.9°$ and $-3.37°<φv<17°$, respectively.

In the above description, the approximate center of the light reception surface of the image sensor of the camera units 11 to 14 and the centroid of the high-resolution area 10a (the optical axis of the optical system) substantially overlap, and the centroid of the high-resolution area 10a matches the position at which the optical axis of the optical system intersects the light reception surface. However, as described above, the approximate center of the light reception surface and the centroid of the high-resolution area 10a (the optical axis of the optical system) may be shifted, and the centroid of the high-resolution area 10a and the optical axis of the optical system may not match the position at which the optical axis of the optical system intersects the light reception surface.

That is, for example, the camera unit 14 is disposed so that the centroid of the high-resolution area (low-distortion area) 10a of the camera unit 14 is shifted upward (the first direction) from a center of the light reception surface 140 of the image sensor, so that vignetting occurs.

When the camera unit 14 is disposed so that a direction (the first direction) of the vignetting is directed, for example, in the direction of the vehicle 1, an angle of view that can be imaged on the outer side of the vehicle body is widened, making it possible to optimize the imaging angle of view and use pixels of the image sensor as effectively as possible.

A portion in which the vignetting occurs is excluded from a range of θlv or θlh. That is, in First Embodiments to 5, Equations 1 to 16 above are calculated so that a portion in which vignetting occurs at an edge of θlv or θlh is not included.

As described above, in First Embodiment to Fifth Embodiment, the high-resolution area (low-distortion area) 10a has a projection characteristic approximate to the central projection scheme of the optical system for normal imaging (that is, if $y=f×\tan θ$) or an equidistant projection scheme (that is, if $y=f×θ$).

Therefore, for example, an image of the high-resolution area (low-distortion area) 10a displayed on the electronic side mirror such as the first display unit 50 has a higher resolution than the low-resolution area (high-distortion area) 10b, making it possible to display the lateral distant side of the vehicle 1 more precisely. Further, this is superior in terms of cost, processing efficiency, miniaturization, or the like, as compared with a case in which the lateral side is imaged using a plurality of camera units having different angles of view.

A display method is not limited as long as each defined area can be displayed. For example, a defined area defined by the width w6 at the distances d6 and d3, an area defined by the widths w3 to w5 at the distances d3 to d5, and an area defined by the widths w1 and w2 at the distances d1 and d2 may be cut out as individual images from the captured images of the camera unit and displayed on different display units. By doing so, it is possible to perform a display according to the purpose of each defined area.

Further, since the area defined by the width w6 at the distances d6 and d3, the area defined by the widths w3 to w5 at the distances d3 to d5, and the area defined by the widths w1 and w2 at the distances d1 and d2 are included in the imaging range, the captured images of the camera unit may be displayed as it is on one display unit. By doing so, it is possible to simplify image cutout processing while allowing the driver to confirm the defined area.

Further, since the optical distortion is small in the high-resolution area 10a of Fifth Embodiment, it is possible to display, in a small distortion state, the image for an electronic rearview mirror or an electronic side mirror to be displayed on the first display unit 50, and for the driver to visually observe the surroundings of the vehicle with a more natural perspective.

Further, since the high-resolution area 10a has small optical distortion, image recognition can be performed in a state of the RAW image signal not subjected to the distortion correction, and a processing load for image recognition can be reduced so that the image recognition can be performed at high speed.

Therefore, an obstacle can be detected early on the basis of the image recognition result, and an operation for avoiding an obstacle can be performed in a timely manner. Thus, if the condition equations of the embodiment are satisfied, it is possible to obtain a great effect particularly at the time of high-speed traveling on an expressway or the like.

Although an example in which a plurality of camera units are used has been described in the above embodiment, the present invention is also effective for a system with only one camera unit.

Sixth Embodiment

In Sixth Embodiment, both a distant-side electronic side mirror (UNR46, class 2) and a lateral side collision warning device (WP29) of the truck can be adopted.

That is, in Sixth Embodiment, in a large freight vehicle, an imaging area for a display for an electronic side mirror and a movable apparatus on the lateral side of the vehicle can be detected, and a detection area for lateral side collision warning for warning the driver if there is a possibility of a collision can be imaged by a single camera.

In general, since if a blind spot on the lateral side of a vehicle is larger if the vehicle is larger, an effect of such a configuration is large. Here, the large freight vehicle is, for example, a vehicle with a gross vehicle weight of 8.0 tons or more.

Figure 8:
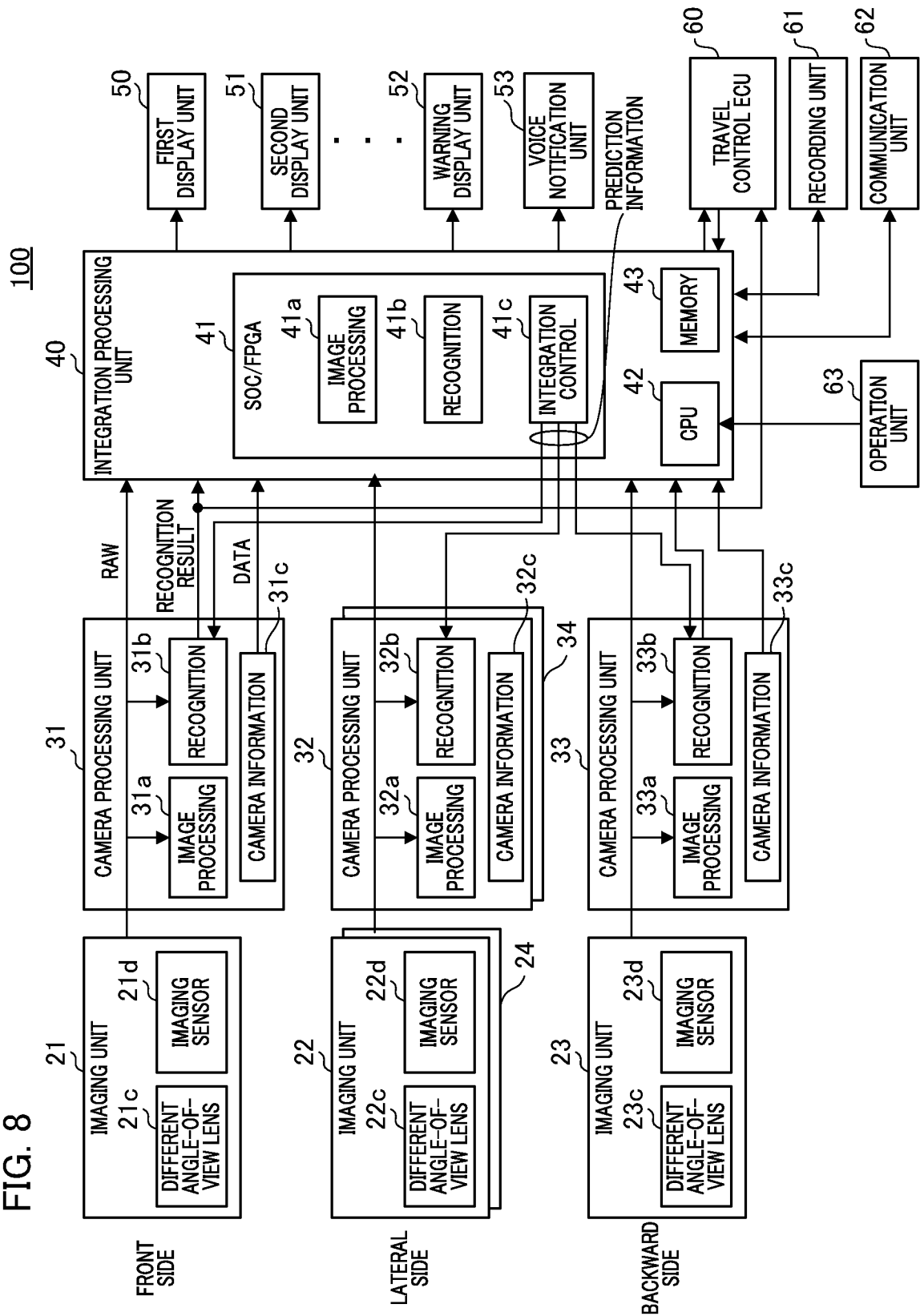
FIG. 8 is a functional block diagram illustrating a configuration of an image processing system in Sixth Embodiment.

First, the image processing system in Sixth Embodiment will be described with reference to FIG. 8. FIG. 8 is a functional block diagram illustrating a configuration of the image processing system in Sixth Embodiment.

The image processing system 100 in Sixth Embodiment is configured to include a warning display unit 52 and a voice notification unit 53 in addition to the configuration of the image processing system in First Embodiment. Hereinafter, functional blocks having different operations or configurations from those in First Embodiment will be described. Further, descriptions of functional blocks having the same operations or configurations as those in First Embodiment will be omitted.

The image processing system 100 in Sixth Embodiment detects a movable apparatus on the lateral side of the vehicle in order to prevent entanglement or collision if the vehicle turns right or left. The movable apparatus here is, for example, a bicycle, a pedestrian, and other vehicles, and is referred to as a detection target in Sixth Embodiment.

The integration control unit 41c determines whether the detection target is included on the basis of the recognition results output by the recognition units 31b to 34b and the recognition unit 41b, and outputs the recognition result. The recognition result output by the integration control unit 41c includes the presence or absence of the detection target, a type or coordinates of the detection target, and speed information.

The warning display unit 52 and the voice notification unit 53 function as a warning unit, and perform lateral side collision warning to the driver using visual information on the basis of the recognition result output from the integration control unit 41c.

The warning display unit 52 may be configured of, for example, an LED, and may be configured to light or blink if information indicating that the detection target is present is included in the recognition result.

Further, the warning display unit 52 may be configured with a display such as a liquid crystal. In this case, if information indicating that the detection target is present is included in the recognition result, the information may be output as an icon or character information on the display.

Further, the warning display unit 52 may be configured to be installed, for example, near an end in the vehicle width direction in front of the driver seat of the vehicle 1 with a display screen directed to a driver direction. Further, the warning display unit 52 may be installed near the first display unit 50 or the second display unit 51, or may be configured to be used instead of or together with the first display unit 50 or the second display unit 51, for example.

The voice notification unit 53 outputs sound using, for example, a speaker on the basis of the recognition result output from the integration control unit 41c. The voice notification unit 53 may be installed, for example, near the end in the vehicle width direction in front of the driver seat of the vehicle 1.

Further, the integration control unit 41c functions as a warning condition determination unit, and performs control so that content of the warning output by the warning display unit 52 or the voice notification unit 53 is changed on the basis of the coordinates or speed of the detection target obtained by the recognition units 31b to 34b and the recognition unit 41b.

Further, the integration control unit 41c may change hue according to a distance between the detection target and the lateral side of the vehicle and display content of the warning display in the warning display unit 52. For example, the integration control unit 41c may perform control so that the display is performed in red if the distance to the detection target is small, in yellow if the distance to the detection target is medium, and in blue or green if the distance to the detection target is greater than a predetermined value.

Further, the integration control unit 41c may be configured to control the warning display unit 52 so that luminance of a warning display increases as the distance to the detection target decreases.

Further, the integration control unit 41c may control the voice notification unit 53 so that a volume of the notification increases as the distance between the detection target and the lateral side of the vehicle decreases, for example.

The integration control unit 41c may be configured to determine whether a traveling speed of the host vehicle input from the travel control unit (ECU) 60 is equal to or lower than a predetermined speed, and perform a warning display using the warning display unit 52 or warning notification using the voice notification unit 53 only if the traveling speed is equal to or less than the predetermined speed.

That is, if the traveling speed of the host vehicle is higher than the predetermined speed, there is a possibility that the detection target cannot be correctly recognized, and thus, with such a configuration, it is possible to perform correct lateral side detection. It is preferable for the predetermined speed to be, for example, about 30 km/h.

Further, since a possibility of collision with the vehicle is high if the detection target is moving, the integration control unit 41c may determine whether a speed of the detection target is within a predetermined range. The integration control unit 41c may be configured to perform the warning display using the warning display unit 52 or the warning notification using the voice notification unit 53 only if the integration control unit 41c determines that the speed of the detection target is within the predetermined range (equal to or higher than a predetermined speed). In this case, it is preferable for a predetermined range of a speed of a predetermined detection target to be, for example, 5 km/h or more and 20 km/h or less.

Further, the integration control unit 41c may determine whether the host vehicle is turning left or right from moving direction information of the host vehicle output from the travel control unit (ECU) 60, and perform the warning display using the warning display unit 52 or the warning notification using the voice notification unit 53 only if the vehicle is turning right or left.

Next, installation condition for the camera unit in Sixth Embodiment will be described with reference to FIGS. 5, 9, and 10.

As described above, FIG. 5 illustrates defined areas in which the driver should confirm the safety around the vehicle through the display of the electronic side mirrors.

Figure 9:
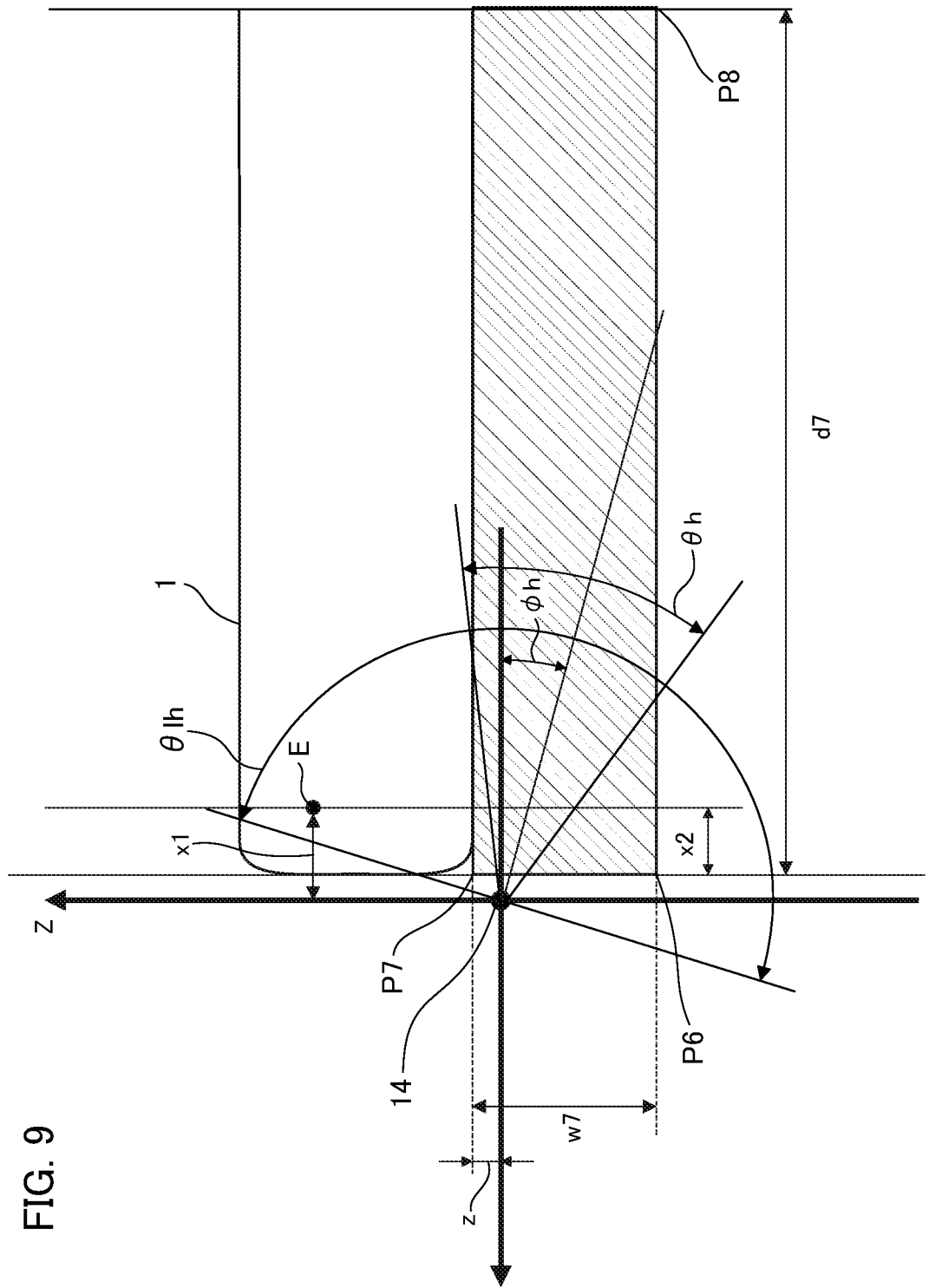
FIG. 9 is a diagram illustrating a detection area required for lateral side detection when a host vehicle according to Sixth Embodiment is viewed from above.

FIG. 9 is a diagram illustrating a detection area required for lateral side detection when the host vehicle is viewed from above according to Sixth Embodiment. In Sixth Embodiment, the camera unit is installed to be able to image the defined area in the high-resolution area 10a of the camera unit, and image the detection area in the low-resolution area 10b.

Areas defined by the distances d1 and d2 from the viewpoint position E of the driver illustrated in FIG. 5 and the widths w1 and w2 corresponding to the respective distances are referred to as the defined areas in Sixth Embodiment.

Figure 10:
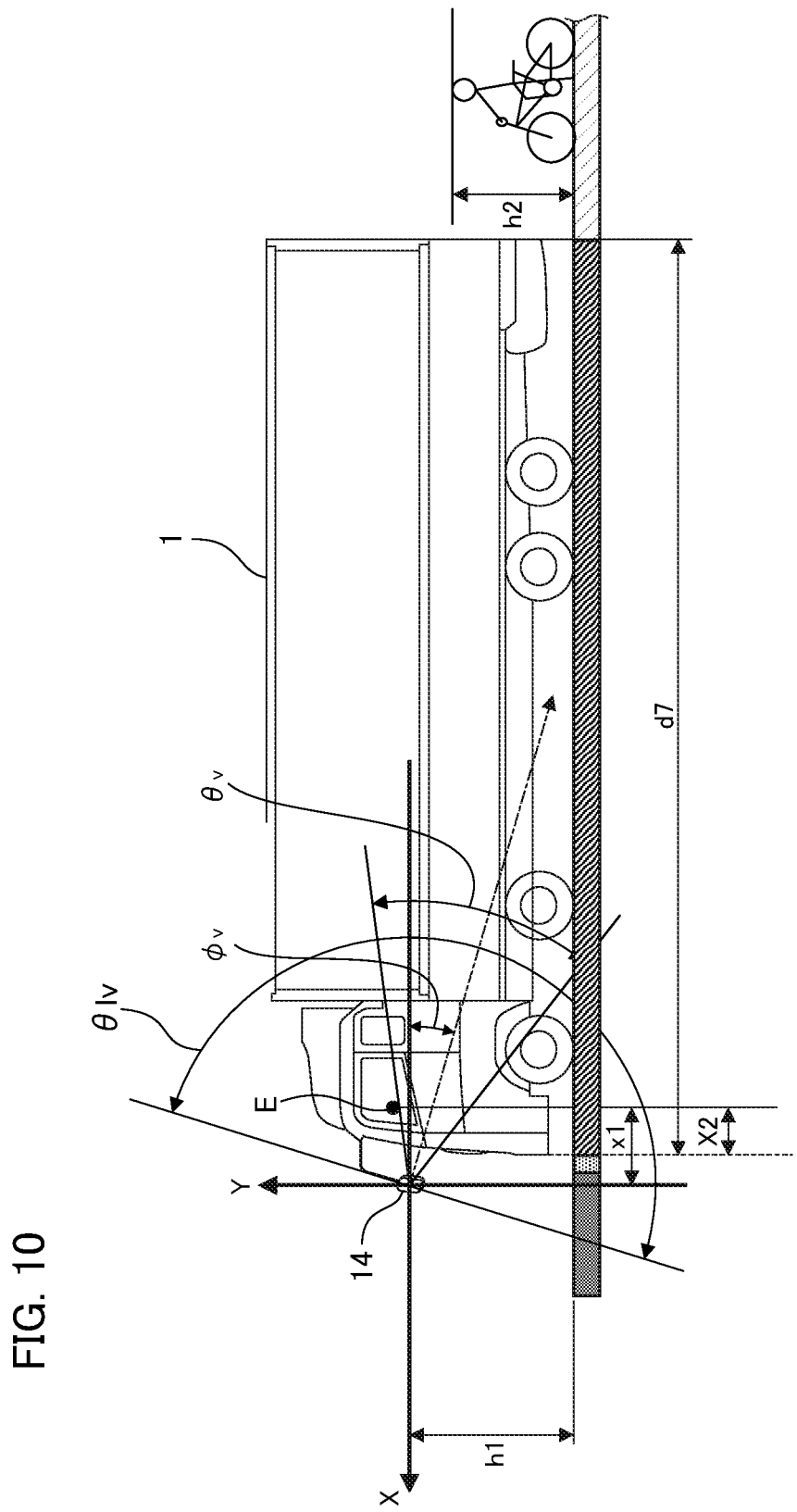
FIG. 10 is a diagram illustrating a detection area required for lateral side detection when the host vehicle according to Sixth Embodiment is viewed from the side.

Further, FIG. 10 is a diagram illustrating a detection area required for lateral side detection when the host vehicle is viewed from the lateral side according to Sixth Embodiment. As illustrated in FIGS. 9 and 10, an area defined by a total vehicle length d7 and the distance w7 from the side of the vehicle is referred to as a detection area in Sixth Embodiment.

This detection area is an area in which there is a high possibility of entanglement or collision if there is an object within the detection area if the host vehicle turns left or right. Therefore, the detection area is included in the imaging range of the camera unit in order to detect a detection target present on the lateral side of the vehicle opposite to the driver seat, which is difficult to visually observe.

It is assumed that the position of the camera unit 14 installed for a display of the side mirrors is disposed in front of the viewpoint position E of the driver by x1 and is offset by z from the lateral side of the vehicle, as illustrated in FIG. 9. It is also assumed that a distance from the viewpoint position E of the driver to the front end of the vehicle is x2.

It is preferable for the offset h1 in the height direction of the camera unit 14 to be larger than a predetermined height h2 as shown in Equation 17. h2 corresponds to a height of the detection target.

That is, $$h1 \geq h2 \quad \text{(Equation 17)}$$

It is preferable to satisfy a condition of Equation 17. This installation condition makes it possible to cause the height direction of the detection target having the predetermined height h2 or less to be included in the imaging range. For example, if a bicycle is the detection target, it is preferable to set h2 to about 1.7 meters. Further, if a pedestrian is included in the detection target, it is preferable to set h2 to about 2 meters.

That is, in order to display a video captured in the high-resolution area on the electronic side mirror, the defined area is captured in the high-resolution area 10a of the camera unit. Further, the camera unit is installed to be able to simultaneously image the entire detection area, including the lateral side at the front end of the vehicle, in order to prevent collisions or entanglement with the detection target present on the lateral side of the vehicle.

Therefore, the camera unit 14 is installed so that a position and angle of the camera unit 14 satisfy conditions of Equations 18 to 24 below, in addition to the conditions of Equations 1 to 4 above. This makes it possible to achieve both detection of the detection target on the lateral side of the vehicle and a display of a high-resolution video on the electronic side mirror.

When the offset x1 of the camera unit is larger than the distance x2 from the viewpoint position E of the driver to the front end of the vehicle, it is necessary to cause the entire width w7 of the ground at a position of the front end of the vehicle to be included in the imaging range in order to capture the detection target present within the detection area.

Therefore, if x2<x1, the camera unit is installed to satisfy Equation 18 below for the vertical direction, making it possible to image a point of contact between the front end of the vehicle and the ground.

$$A\tan(h1/(x1-x2))-\theta lv/2 < \phi v \quad \text{(Equation 18)}$$

Further, it is possible to image the detection target at the points P6 and P7 in FIG. 9 by satisfying Equation 19 below for the horizontal direction.

$$A\tan((w7-z)/(x1-x2))-\theta lh/2 < \phi h < -A\tan(z/(x1-x2))+\theta lh/2 \quad \text{(Equation 19)}$$

On the other hand, if the offset x1 of the camera unit is smaller than a distance x2 to the front end of the movable apparatus, it is necessary to cause the detection target at the predetermined height h2 at a position of the distance x2 to the front end of the movable apparatus to be included in the imaging range in order to capture the detection target present in the detection area.

Therefore, if x2>x1, it is possible to image the detection target present at the point P7 in FIG. 9 by satisfying Equation 20 below for the vertical direction.

$$-A\tan((h1-h2)/(x2-x1))-\theta lv/2+180° < \phi v \quad \text{(Equation 20)}$$

On the other hand, it is possible to image the detection target present at the point P6 in FIG. 9 by satisfying Equation 21 below for the horizontal direction.

$$-A\tan((w7-z)/(x2-x1))-\theta lh/2+180° < \phi h \quad \text{(Equation 21)}$$

Further, if the distance x2 to the front end of the movable apparatus is equal to the offset x1 of the camera unit, it is preferable to image on the outer side directly below the camera unit in order to capture the detection target.

Therefore, if x2=x1,

It is preferable to satisfy Equation 22 below for the vertical direction.

$$+90° < \phi v + \theta lv/2 \quad \text{(Equation 22)}$$

Further, it is preferable for Equation 23 below to be satisfied for the vehicle body side in the horizontal direction.

$$-90° > \phi h - \theta lh/2 \quad \text{(Equation 23)}$$

Further, it is preferable to satisfy Equation 24 below for the outer side in the horizontal direction.

$$+90° < \phi h + \theta lh/2 \quad \text{(Equation 24)}$$

It is possible to cause the detection targets present at the points P6 and P7 in FIG. 9 to be included in the imaging range by satisfying the conditions of Equations 22 to 24 above.

Although an example of the installation condition for the camera unit 14 on the left lateral side of the vehicle if the driver seat is on the right side has been described in the description of Sixth Embodiment above, the same conditions may be satisfied for the camera unit 12 on the right lateral side of the vehicle if the driver seat is on the left side.

As a specific example of the defined area of Sixth Embodiment described above, it is preferable for the driver to be able to confirm the defined areas with d1=4 m, w1=1 m, d2=30 m, and w2=5 m with the electronic side mirrors. Further, it is preferable to be able to image the detection target within the detection area of w7=3 m and a total length of the vehicle d7=12 m as a specific example of the detection area.

Further, it is assumed that, for example, a camera unit in which each of a vertical angle of view $\theta v$ and a horizontal angle of view $\theta h$ of the high-resolution area 10a is 47.2 degrees is used, the camera unit is installed at a position of x1=1.1 m, x2=0.9 m, z=0.3 m, and h1=2.3 m, and the height of the detection target is h2=1.7 m.

In this case, the camera unit is installed so that the vertical direction angle $\phi v$ and the horizontal angle $\phi h$ of the optical axis of the camera unit satisfy $$0.67° < \phi v < 27.83° \text{ and}$$

$$-4.24° < \phi h < 27.00°, \text{respectively}.$$

This makes it possible to simultaneously perform capturing of an image for displaying the high-resolution and low-distortion image on the electronic side mirror while imaging an angle of view required for the lateral side collision detection system.

Further, it is more preferable to increase a width of the detection area in the specific example so that, for example, w7=4.25 m because the detection target can be detected in a wider range. In this case, the camera unit is installed so that the vertical direction angle $\phi v$ and the horizontal angle $\phi h$ of the optical axis of the camera unit satisfy $$0.67° < \phi v < 27.83° \text{ and}$$

$$-2.90° < \phi h < 27.00°, \text{respectively}.$$

This makes it possible to simultaneously perform capturing of an image for displaying the high-resolution and low-distortion image on the electronic side mirror while imaging the angle of view required for a wider range of lateral side collision detection system.

As described above, since the optical distortion is small in the high-resolution area 10a of Sixth Embodiment, it is possible to display, in a small distortion state, the image for an electronic rearview mirror or an electronic side mirror to be displayed on the first display unit 50, and for the driver to visually observe the surroundings of the vehicle with a more natural perspective.

Further, it is possible to detect a movable apparatus on the lateral side of the vehicle by imaging the detection area on the lateral side of the vehicle, and for the driver to reduce a possibility of entanglement or collision by issuing a warning. Therefore, according to Sixth Embodiment, it is possible to simultaneously perform capturing of an image for displaying the high-resolution and low-distortion image on the electronic side mirror while imaging the angle of view required for lateral side collision detection system.

Seventh Embodiment

In Seventh Embodiment, a system includes an electronic side mirror for distant-side confirmation (UNR46, class 2) and a lateral side collision warning device (WP29) of a truck, a point P8 in FIG. 9 is included in the high-resolution area and can be imaged with one different angle-of-view camera.

In Seventh Embodiment, the camera unit is installed so that the detection target present at the point P8 in FIG. 9 in the detection area of Sixth Embodiment is included in the imaging range of the high-resolution area of the camera unit. Hereinafter, functional blocks having different operations or configurations from those of Sixth Embodiment will be described. Further, description of functional blocks having the same operations or configurations as those of Sixth Embodiment will be omitted.

In Seventh Embodiment, since the camera unit is installed so that the detection target present at the point P8 in FIG. 9 in the detection area of Sixth Embodiment is included in the imaging range of the high-resolution area of the camera unit, it is possible to reduce an amount of distortion correction as pre-processing of processing for recognizing the detection target. Therefore, there is an advantage that a time required for calculation resources or processing can be reduced.

In Seventh Embodiment, the camera unit is installed to be able to image the point P8 in FIG. 9 in the defined area and detection area of Sixth Embodiment in the high-resolution area 10a of the camera unit while imaging the detection area of Sixth Embodiment in the low-resolution area. As installation conditions in this case, a condition of Equation 25 below, in addition to the conditions of Equations 1 to 4 and 17 to 24 above, is satisfied.

That is, for the horizontal direction, a condition of Equation 25 below is satisfied in order to image the point P8 in FIG. 9 in the high-resolution area 10a of the camera unit.

$$A\tan((w7-z)/(x1-x2+d7))-\theta h/2 < \phi h \quad \text{(Equation 25)}$$

As a specific example of the defined area of Seventh Embodiment described above, it is preferable for the driver to be able to confirm the defined area with $d1=4$ m, $w1=1$ m, $d2=30$ m, and $w2=5$ m with the electronic side mirrors. Further, it is preferable to be able to image the detection target within the detection area of $w7=3$ m and a total length of the vehicle $d7=7$ m as a specific example of the detection area.

Further, it is assumed that, for example, a camera unit in which each of a vertical angle of view $\theta v$ and a horizontal angle of view $\theta h$ of the high-resolution area 10a is 47.2 degrees is used, the camera unit is installed at a position of $x1=1.1$ m, $x2=0.9$ m, $z=0.3$ m, and $h1=2.3$ m, and the height of the detection target is $h2=1.7$ m.

In this case, the camera unit is installed so that the vertical direction angle $\phi v$ and the horizontal angle $\phi h$ of the optical axis of the camera unit satisfy $$0.67° < \phi v < 27.83° \text{ and}$$

$$-3.04° < \phi h < 27.00°, \text{respectively.}$$

This makes it possible to simultaneously perform capturing of an image for displaying the high-resolution and low-distortion image on the electronic side mirror while imaging the angle of view required for a wider range of lateral side collision detection system.

Further, as an advantage unique to Seventh Embodiment, since it is possible to reduce the amount of distortion correction as the pre-processing of the processing for recognizing the detection target, there is an advantage that a time required for calculation resources or processing can be reduced.

Eighth Embodiment

In Eighth Embodiment, an electronic side mirror for distant-side confirmation (UNR46, class 2) of a truck, an electronic side mirror for a wide-angle confirmation (UNR46, class 4) of the truck, and a lateral side collision warning device (WP29) are realized by using one different angle-of-view camera.

That is, in Eighth Embodiment, imaging is possible in the area defined in Second Embodiment, in addition to the detection area of Sixth Embodiment. In general, a large freight vehicle requires a driver to confirm safety in a wider range in a lateral direction as compared with a passenger car or small freight vehicle, and needs to detect a detection target present on the lateral side of the vehicle and warn the driver in order to reduce a possibility of entanglement or collision if the vehicle turns left or right.

Hereinafter, functional blocks having different operations or configurations from those of Sixth Embodiment will be described. Description of functional blocks having the same operations or configuration as those of Sixth Embodiment will be omitted. Further, since the defined area of the Present Embodiment is the same as that of Second Embodiment, description thereof will be omitted.

In Eighth Embodiment, the camera unit is installed to be able to image all the detection areas illustrated in FIG. 9 while imaging all the defined areas illustrated in FIG. 5 in the high-resolution area 10a of the camera unit. Therefore, the conditions of Equations 1 to 9 and Equations 17 to 24 above as installation conditions are satisfied.

In Eighth Embodiment, it is preferable for the driver to be able to confirm, for example, a defined area of $d1=4$ m, $w1=1$ m, $d2=30$ m, $w2=5$ m, $d3=1.5$, $w3=4.5$, $d4=10$, $w4=15$, $d5=25$, and $w5=15$ with the electronic side mirror. Further, it is preferable to be able to image the detection target within the detection area of $w7=3$ m and a total length of the vehicle $d7=12$ m as a specific example of the detection area.

Further, it is assumed that, for example, a camera unit in which each of a vertical angle of view $\theta v$ and a horizontal angle of view $\theta h$ of the high-resolution area 10a is 47.2 degrees is used, the camera unit is installed at a position of $x1=1.1$ m, $x2=0.9$ m, $z=0.3$ m, and $h1=2.3$ m, and the height of the detection target is $h2=1.7$ m.

In this case, the camera unit is installed so that the vertical direction angle $\phi v$ and the horizontal angle $\phi h$ of the optical axis of the camera unit satisfy $$0.67° < \phi v < 17.90° \text{ and}$$

$$-4.24° < \phi h < 17.02°, \text{respectively.}$$

This makes it possible to simultaneously perform capturing of an image for displaying the high-resolution and low-distortion image on the electronic side mirror while imaging the angle of view required for a wider range of lateral side collision detection system. The camera unit is installed as in Eighth Embodiment, making it possible to image both a wider range of area in the lateral direction and a detection area to prevent entanglement or collision.

Nineth Embodiment

In Nineth Embodiment, an electronic side mirror for distant-side confirmation (UNR46, class 2) of a truck and an electronic side mirror for a wide-angle confirmation (UNR46, class 4) of the truck are included. Further, the points P5 and P5' in FIG. 5 are captured in the high-resolution area, and a lateral side collision warning device (WP29) is realized using one a different angle-of-view camera.

That is, in Nineth Embodiment, imaging is possible in the area defined in Third Embodiment, in addition to the detection area of Sixth Embodiment. In Nineth Embodiment, the camera unit is installed so that the points P5 and P5' in FIG. 5 are included in the imaging range in the high-resolution area in the defined area of Eighth Embodiment.

This makes it possible to confirm objects at the points P5 and P5' with high resolution, and also perform imaging of the detection area to prevent entanglement or collision.

Further, since a degree of freedom in an installation direction in which a condition of the optical axis can be relaxed can be higher than that in Eighth Embodiment, it is possible to more easily perform imaging of both the defined area and the detection area, for example, even with a camera unit with a narrow angle of view in the high-resolution area.

Since each functional block of the image processing system 100 of Nineth Embodiment is the same as that of Sixth Embodiment, description thereof will be omitted. Further, since the defined area of Nineth Embodiment is the same as that of Third Embodiment, description thereof will be omitted. As installation conditions in Nineth Embodiment, Equations 5, 6, 9, and 17 to 24 are satisfied, in addition to the conditions of Equations 2 to 4.

By installing a camera unit as in Nineth Embodiment, it is possible to simultaneously perform capturing of an image for displaying the high-resolution and low-distortion image on the electronic side mirror while imaging the angle of view required for lateral side collision detection system. Further, both high-resolution imaging of the objects at the points P5 and P5' and imaging of the detection area to prevent entanglement or collision can be achieved.

Tenth Embodiment

In Tenth Embodiment, an electronic side mirror for distant-side confirmation (UNR46, class 2) of the truck and electronic side mirror for a wide-angle confirmation (UNR46, class 4) of the truck are included. Further, the points P4, P4', P5, and P5' in FIG. 5 are captured in the high-resolution area, and a lateral side collision warning device (WP29) is configured so that imaging can be performed by a single a different angle-of-view camera.

In Tenth Embodiment, imaging is possible in the area defined in Fourth Embodiment, in addition to the detection area of Sixth Embodiment. In Tenth Embodiment, the camera unit is installed so that the points P4, P4', P5, and P5' in FIG. 5 are included in the imaging range of the high-resolution area in the defined area of Eighth Embodiment.

This makes it possible to confirm the objects at the points P4, P4', P5, and P5' with high resolution, and image the detection area to prevent entanglement or collision.

Further, since the installation condition can be relaxed as compared with Eighth Embodiment, it is possible to perform imaging of both the defined area and the detection area even with a camera unit with a narrow angle of view in the high-resolution area.

Hereinafter, since respective functional blocks of the image processing system 100 in Tenth Embodiment are the same as those of Sixth Embodiment, description thereof will be omitted. Further, since the defined area of Tenth Embodiment is the same as that of Fourth Embodiment, description thereof will be omitted. As installation conditions in Tenth Embodiment, conditions of Equations 5, 6, 8, 9, and 17 to 24 are satisfied, in addition to the conditions of Equations 2 to 4.

The camera unit is installed as in Tenth Embodiment, making it possible to simultaneously perform capturing of an image for displaying the high-resolution and low-distortion image on the electronic side mirror while imaging the angle of view required for a wider range of lateral side collision detection system. Further, both high-resolution imaging of the objects at the points P4, P4', P5, and P5' and imaging of the detection area to prevent entanglement or collision are possible.

Eleventh Embodiment

In Eleventh Embodiment, an electronic side mirror for distant-side confirmation (UNR46, class 2) of a truck, an electronic side mirror for lateral near side confirmation (UNR46, class 5) of the truck, and a lateral side collision warning device (WP29) are realized by using one different angle-of-view camera.

That is, in Eleventh Embodiment, imaging is possible in the area defined in Fifth Embodiment, in addition to the detection area of Sixth Embodiment. Further, it is preferable for both a defined area for allowing the driver to confirm the ground on the side opposite to the driver seat in the image, and a detection area for detecting the lateral side of the vehicle to reduce a possibility of entanglement or collision if the vehicle turns left or right to be included in the imaging range.

Since the configuration in the Eleventh Embodiment is the same as the configuration in Sixth Embodiment, description thereof will be omitted. Further, since the defined area in Eleventh Embodiment is the same as that in Fifth Embodiment, description thereof will be omitted.

In Eleventh Embodiment, the camera unit is installed to be able to image all of the areas defined by the width w6 at the positions of the distances d6 and d3 illustrated in FIGS. 6 and 7 and the detection areas illustrated in FIG. 9 while imaging all the defined areas illustrated in FIG. 5 in the high-resolution area 10a of the camera unit.

As installation conditions in this case, conditions of Equations 10 to 24, in addition to the conditions of Equations 1 to 4 above, are satisfied.

In Eleventh Embodiment, it is preferable for the driver to be able to confirm, for example, a defined area of d1=4 m, w1=1 m, d2=30 m, w2=5 m, d3=1.5, w3=4.5, d4=10, w4=15, d5=25, and w5=15 with the electronic side mirror.

Further, it is preferable to be able to image the detection target within the detection area of w7=3 m and a total length of the vehicle d7=12 m as a specific example of the detection area. Further, it is assumed that, for example, a camera unit in which each of a vertical angle of view θv and a horizontal angle of view θh of the high-resolution area 10a is 47.2 degrees is used, the camera unit is installed at a position of x1=1.1 m, x2=0.9 m, z=0.3 m, and h1=2.3 m, and the height of the detection target is h2=1.7 m.

In this case, the camera unit is installed so that the vertical direction angle φv and the horizontal angle φh of the optical axis of the camera unit satisfy $$0.67° < φv < 17.90° \text{ and}$$

$$-3.37° < φh < 17.02°, \text{respectively.}$$

This makes it possible to simultaneously perform capturing of an image for displaying the high-resolution and low-distortion image on the electronic side mirror while imaging the angle of view required for a wider range of lateral side collision detection system.

Further, in this case, the condition of any one of Seventh Embodiment to Tenth Embodiment may be satisfied. By doing so, it is possible to cause each defined area to be included in the imaging range with one camera unit.

By installing a camera unit as in Eleventh Embodiment, it is possible to simultaneously perform capturing of an image for displaying the high-resolution and low-distortion image on the electronic side mirror while imaging the angle of view required for lateral side collision detection system. Further, it is possible to cause both a defined area for allowing the driver to confirm the ground on the side opposite to the driver seat in the image, and a detection area for detecting the lateral side of the vehicle to reduce a possibility of entanglement or collision if the vehicle turns left or right to be included in the imaging range.

Twelfth Embodiment

At least one of the various functions, processes, and methods described in First Embodiment to Eleventh Embodiment described above can be implemented using a program. Hereinafter, in Twelfth Embodiment, a program for realizing at least one of the various functions, processes, and methods described in First to Eleventh Embodiments described above is referred to as "program X."

Further, a computer for executing program X will be referred to as a "computer Y". Examples of the computer Y are a personal computer, a microcomputer, and a central processing unit (CPU). A computer such as the image processing system in the above-described embodiments is also an example of the computer Y.

At least one of the various functions, processes, and methods described in First to Eleventh Embodiments described above can be realized by the computer Y executing the program X. In this case, the program X is supplied to computer Y via a computer-readable storage medium.

A computer-readable storage medium in Twelfth Embodiment includes at least one of a hard disk device, a magnetic storage device, an optical storage device, a magneto-optical storage device, a memory card, a ROM, and a RAM. Further, the computer-readable storage medium in Twelfth Embodiment is a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. First Embodiment to Twelfth Embodiment may be combined appropriately.

In addition, as a part or the whole of the control according to the embodiments, a computer program realizing the function of the embodiments described above may be supplied to the movable apparatus through a network or various storage media. Then, a computer (or a CPU, an MPU, or the like) of the movable apparatus may be configured to read and execute the program. In such a case, the program and the storage medium storing the program configure the present invention.

This application claims the benefit of Japanese Patent Application No. 2022-091097, filed on Jun. 3, 2022, which is hereby incorporated by reference herein in its entirety.

What is claimed is:

1. A movable apparatus comprising:
a camera unit including an optical system for forming an optical image with a high-resolution area and a low-resolution area on a light reception surface of an imaging unit, the camera unit being installed on the lateral side of the movable apparatus,
wherein the camera unit is installed to satisfy $$A \tan(h1/(d1+x1))-θv/2 < φv < A \tan(h1/(d2+x1))+θv/2 \quad \text{(Equation 2)}$$

$$Φh\_limit = \max(A \tan((w1-z)/(d1+x1))-θh/2, A \tan((w2-z)/(d2+x1))-θh/2) \quad \text{(Equation 3)}$$

$$Φh\_limit < φh < -A \tan(z/(d1+x1))+θh/2 \quad \text{(Equation 4)}$$

when a vertical angle of view of the high-resolution area is θv, a horizontal angle of view is θh, a vertical angle of an optical axis of the optical system is φv, a horizontal angle is φh, an offset between a viewpoint position of a driver in a long axis direction of the movable apparatus and the camera unit is x1, an offset of the camera unit from a side of the movable apparatus in a short axis direction of the movable apparatus is z, an offset in a height direction of the camera unit from the ground is h1, distances from the viewpoint position of the driver in a long axis direction are d1 and d2, and predetermined widths on the ground at the distances d1 and d2 are w1 and w2, and to satisfy if $x2 < x1$, $$A \tan(h1/(x1-x2))-θlv/2 < φv \quad \text{(Equation 18)}$$

$$A \tan((w7-z)/(x1-x2))-θlh/2 < φh < -A \tan(z/(x1-x2))+θlh/2 \quad \text{(Equation 19)}$$

if $x2 > x1$, $$-A \tan((h1-h2)/(x2-x1))-θlv/2+180° < φv \quad \text{(Equation 20)}$$

$$-A \tan((w7-z)/(x2-x1))-θlh/2+180° < φh \quad \text{(Equation 21) and}$$

if $x2 = x1$, $$+90° < φv+θlv/2 \quad \text{(Equation 22)}$$

$$-90° > φh-θlh/2 \quad \text{(Equation 23)}$$

$$+90° < φh+θlh/2 \quad \text{(Equation 24)}$$

when a vertical angle of view of the low-resolution area is θlv, a horizontal angle of view is θlh, a predetermined height from the ground is h2, a distance from the viewpoint position of the driver to a front end of the movable apparatus is x2, a total length of the movable apparatus is d7, and a predetermined width on the ground is w7.

2. The movable apparatus according to claim 1, wherein h2 corresponds to a height of a detection target, and
the camera unit is installed to satisfy h1>=h2.

3. The movable apparatus according to claim 1, wherein the viewpoint position of the driver is a position of an eye at a seating position of the driver or a center position of a seat surface of the driver.

4. The movable apparatus according to claim 1, wherein the high-resolution area and the low-resolution area correspond to a low-distortion area and a high-distortion area, respectively.

5. The movable apparatus according to claim 4, wherein, when a focal length of the optical system is f, a half angle of view is θ, an image height on an image surface is y, and a projection characteristic representing a relationship between the image height y and the half angle of view θ is y(θ), y(θ) in the low-distortion area is larger than f×θ and is different from the projection characteristic in the high-distortion area.

6. The method according to claim 5, wherein the low-distortion area is configured to have a projection characteristic approximate to a central projection scheme (y=f×tan θ) or an equidistant projection scheme (y=f×θ).

7. The movable apparatus according to claim 5, wherein, when θ max is a maximum half angle of view of the optical system, the optical system is configured to satisfy:

$$1 < f \times \sin(\theta\ max)/y(\theta\ max) \le 1.9 \quad \text{(Equation 1)}$$

8. The movable apparatus according to claim 7, wherein w1 is 1 m, w2 is 4 m, the distance d1 is 4 m, and d2 is 20 m.

9. The movable apparatus according to claim 8, wherein w7 is 3 m.

10. The movable apparatus according to claim 8, wherein w7 is 4.25 m.

11. The movable apparatus according to claim 1, wherein the camera unit is disposed to satisfy conditions:

$$A \tan(h/(d3+x)) - \theta v/2 > \phi v \quad \text{(Equation 5)}$$

$$-A \tan(z/(d3+x)) + \theta h/2 > \phi h \quad \text{(Equation 6)}$$

$$A \tan((w3-z)/(d3+x)) - \theta h/2 < \phi h \quad \text{(Equation 7)}$$

$$A \tan((w4-z)/(d4+x)) - \theta h/2 < \phi h \quad \text{(Equation 8)}$$

$$A \tan((w5-z)/(d5+x)) - \theta h/2 < \phi h \quad \text{(Equation 9)}$$

when d3 to d5 are distances from the viewpoint position of the driver for the long axis direction, and w3 to w5 are predetermined widths on the ground at the distances d3 to d5.

12. The movable apparatus according to claim 1, wherein the camera unit is disposed to satisfy conditions:

$$A \tan(h/(d3+x)) - \theta v/2 > \phi v \quad \text{(Equation 5)}$$

$$-A \tan(z/(d3+x)) + \theta h/2 > \phi h \quad \text{(Equation 6)}$$

$$A \tan((w5-z)/(d5+x)) - \theta h/2 < \phi h \quad \text{(Equation 9)}$$

when d3 to d5 are distances from the viewpoint position of the driver for the long axis direction, and w5 is a predetermined width on the ground at the distance d5.

13. The movable apparatus according to claim 1, wherein the camera unit is disposed to satisfy conditions:

$$A \tan(h/(d3+x)) - \theta v/2 > \phi v \quad \text{(Equation 5)}$$

$$-A \tan(z/(d3+x)) + \theta h/2 > \phi h \quad \text{(Equation 6)}$$

$$A \tan((w4-z)/(d4+x)) - \theta h/2 < \phi h \quad \text{(Equation 8)}$$

$$A \tan((w5-z)/(d5+x)) - \theta h/2 < \phi h \quad \text{(Equation 9)}$$

when d3 to d5 are distances behind the viewpoint position of the driver for the long axis direction, and w4 and w5 are predetermined widths on the ground at the distances d4 and d5.

14. The movable apparatus according to claim 1, wherein the camera unit is disposed to satisfy conditions:

if $x > d6$, $$A \tan(h/(x-d6)) - \theta lv/2 < \phi v \quad \text{(Equation 10)}$$

$$A \tan((w6-z)/(x-d6)) - \theta lh/2 < \phi h < -A \tan(z/(x-d6)) + \theta lh/2 \quad \text{(Equation 18)}$$

if $x < d6$, $$A \tan(h/(d6-x)) + 90° - \theta lv/2 < \phi v \quad \text{(Equation 19)}$$

$$A \tan((w6-z)/(x-d6)) - \theta lh/2 + 90° < \phi h < -A \tan(z/(x-d6)) + \theta lh/2 - 90° \quad \text{(Equation 20)},$$

and if $x = d6$, $$+90° < +\theta lv/2 \quad \text{(Equation 14)}$$

$$-90° > \phi h - \theta lh/2 \quad \text{(Equation 15)}$$

$$+90 < \phi h + \theta lh/2 \quad \text{(Equation 16)}$$

when d6 is a distance from the viewpoint position of the driver for the long axis direction, and w6 is a predetermined width on the ground at the distance d6.

15. The movable apparatus according to claim 1, comprising at least one processor or circuit configured to function as: an image processing unit configured to perform distortion correction on an image signal obtained from the imaging unit on the basis of characteristic information of the optical system.

16. The movable apparatus according to claim 15, wherein the image processing unit includes an image recognition unit configured to perform image recognition on the image signal obtained from the imaging unit.

17. The movable apparatus according to claim 16, wherein the image recognition unit detects a bicycle.

18. The movable apparatus according to claim 16, wherein the at least one processor or circuit is further configured to function as:
a warning unit configured to issue a warning on the basis of a result of image recognition by the image recognition unit.

19. The movable apparatus according to claim 18, wherein the warning unit includes a voice notification unit configured to issue a voice warning.

20. The movable apparatus according to claim 18, wherein the warning unit performs the warning on the basis of a result of image recognition in the image recognition unit when a speed of the movable apparatus is equal to or lower than a predetermined speed.

21. The movable apparatus according to claim 18, wherein the warning unit performs the warning when a speed of a detection target detected by image recognition in the image recognition unit is equal to or lower than a predetermined speed.

22. The movable apparatus according to claim 1, comprising:
a display unit configured to display at least an image corresponding to the high-resolution area.

23. A control method for a movable apparatus including a camera unit including an optical system for forming an optical image with a high-resolution area and a low-resolution area on a light reception surface of an imaging unit, the camera unit being installed on the lateral side of the movable apparatus, the control method for a movable apparatus comprising:

installing the camera unit to satisfy $$A\tan(h1/(d1+x1))-\theta v/2<\phi v<A\tan(h1/(d2+x1))+\theta v/2 \quad \text{(Equation 2)}$$

$$\Phi h\_limit=\max(A\tan((w1-z)/(d1+x1))-\theta h/2, A\tan((w2-z)/(d2+x1))-\theta h/2) \quad \text{(Equation 3)}$$

$$\Phi h\_limit<\phi h<-A\tan(z/(d1+x1))+\theta h/2 \quad \text{(Equation 4)}$$

when a vertical angle of view of the high-resolution area is θv, a horizontal angle of view is θh, a vertical angle of an optical axis of the optical system is φv, a horizontal angle is φh, an offset between a viewpoint position of a driver in a long axis direction of the movable apparatus and the camera unit is x1, an offset of the camera unit from a side of the movable apparatus in a short axis direction of the movable apparatus is z, an offset in a height direction of the camera unit from the ground is h1, distances from the viewpoint position of the driver in a long axis direction are d1 and d2, and predetermined widths on the ground at the distances d1 and d2 are w1 and w2, and to satisfy if x2<x1, $$A\tan(h1/(x1-x2))-\theta lv/2<\phi v \quad \text{(Equation 18)}$$

$$A\tan((w7-z)/(x1-x2))-\theta lh/2<\phi h<-A\tan(z/(x1-x2))+\theta lh/2 \quad \text{(Equation 19)}$$

if x2>x1, $$-A\tan((h1-h2)/(x2-x1))-\theta lv/2+180°<\phi v \quad \text{(Equation 20)}$$

$$-A\tan((w7-z)/(x2-x1))-\theta lh/2+180°<\phi h \quad \text{(Equation 21) and}$$

if x2=x1, $$+90°<\phi v+\theta lv/2 \quad \text{(Equation 22)}$$

$$-90°>\phi h-\theta lh/2 \quad \text{(Equation 23)}$$

$$+90°<\phi h+\theta lh/2 \quad \text{(Equation 24)}$$

when a vertical angle of view of the low-resolution area is θlv, a horizontal angle of view is θlh, a predetermined height from the ground is h2, a distance from the viewpoint position of the driver to a front end of the movable apparatus is x2, a total length of the movable apparatus is d7, and a predetermined width on the ground is w7;

an image processing step of performing image processing on the image obtained from the imaging unit; and a display step of displaying the image subjected to the image processing in the image processing step.

24. A non-transitory computer-readable storage medium configured to store a computer program to control a movable apparatus configured to have a camera unit including an optical system for forming an optical image with a high-resolution area and a low-resolution area on a light reception surface of an imaging unit, the camera unit being installed on the lateral side of the movable apparatus, wherein the camera unit is installed to satisfy $$A\tan(h1/(d1+x1))-\theta v/2<\phi v<A\tan(h1/(d2+x1))+\theta v/2 \quad \text{(Equation 2)}$$

$$\Phi h\_limit=\max(A\tan((w1-z)/(d1+x1))-\theta h/2, A\tan((w2-z)/(d2+x1))-\theta h/2) \quad \text{(Equation 3)}$$

$$\Phi h\_limit<\phi h<-A\tan(z/(d1+x1))+\theta h/2 \quad \text{(Equation 4)}$$

when a vertical angle of view of the high-resolution area is θv, a horizontal angle of view is θh, a vertical angle of an optical axis of the optical system is φv, a horizontal angle is φh, an offset between a viewpoint position of a driver in a long axis direction of the movable apparatus and the camera unit is x1, an offset of the camera unit from a side of the movable apparatus in a short axis direction of the movable apparatus is z, an offset in a height direction of the camera unit from the ground is h1, distances from the viewpoint position of the driver in a long axis direction are d1 and d2, and predetermined widths on the ground at the distances d1 and d2 are w1 and w2, and to satisfy if x2<x1, $$A\tan(h1/(x1-x2))-\theta lv/2<\phi v \quad \text{(Equation 18)}$$

$$A\tan((w7-z)/(x1-x2))-\theta lh/2<\phi h<-A\tan(z/(x1-x2))+\theta lh/2 \quad \text{(Equation 19)}$$

if x2>x1, $$-A\tan((h1-h2)/(x2-x1))-\theta lv/2+180°<\phi v \quad \text{(Equation 20)}$$

$$-A\tan((w7-z)/(x2-x1))-\theta lh/2+180°<\phi h \quad \text{(Equation 21) and}$$

if x2=x1, $$+90°<\phi v+\theta lv/2 \quad \text{(Equation 22)}$$

$$-90°>\phi h-\theta lh/2 \quad \text{(Equation 23)}$$

$$+90°<\phi h+\theta lh/2 \quad \text{(Equation 24)}$$

when a vertical angle of view of the low-resolution area is θlv, a horizontal angle of view is θlh, a predetermined height from the ground is h2, a distance from the viewpoint position of the driver to a front end of the movable apparatus is x2, a total length of the movable apparatus is d7, and a predetermined width on the ground is w7, and wherein the computer program comprises instructions for executing following processes:

an image processing step of performing image processing on the image obtained from the imaging unit; and a display step of displaying the image subjected to the image processing in the image processing step.

\* \* \* \* \*